US012260761B2

(12) United States Patent
Liu

(10) Patent No.: US 12,260,761 B2
(45) Date of Patent: Mar. 25, 2025

(54) INFORMATION PROCESSING METHOD AND APPARATUS, COMPUTER DEVICE AND STORAGE MEDIUM

(71) Applicant: Tencent Cloud Computing (Beijing) Co., Ltd., Beijing (CN)

(72) Inventor: Zhihuang Liu, Beijing (CN)

(73) Assignee: TENCENT CLOUD COMPUTING (BEIJING) CO., LTD., Beijing (CN)

( * ) Notice: Subject to any disclaimer, the term of this patent is extended or adjusted under 35 U.S.C. 154(b) by 157 days.

(21) Appl. No.: 18/115,640

(22) Filed: Feb. 28, 2023

(65) Prior Publication Data
US 2023/0215272 A1    Jul. 6, 2023

Related U.S. Application Data

(63) Continuation of application No. PCT/CN2021/107727, filed on Jul. 21, 2021.

(30) Foreign Application Priority Data

Apr. 26, 2021   (CN) .......................... 202110456768.X

(51) Int. Cl.
G08G 1/14        (2006.01)
G06F 18/23       (2023.01)
G08G 1/01        (2006.01)

(52) U.S. Cl.
CPC ............. G08G 1/146 (2013.01); G06F 18/23 (2023.01); G08G 1/0133 (2013.01); G08G 1/0145 (2013.01)

(58) Field of Classification Search
CPC .... G08G 1/146; G08G 1/0133; G08G 1/0145; G06F 18/23

(Continued)

(56) References Cited

U.S. PATENT DOCUMENTS 9,807,186 B1 * 10/2017 Paul ....................... H04L 67/12
10,403,144 B1 *  9/2019 Ledet .................... H04W 4/023
(Continued)

FOREIGN PATENT DOCUMENTS

CN    101777253 A    7/2010
CN    105185115 A    12/2015
(Continued)

OTHER PUBLICATIONS

Tencent Technology, ISR, PCT/CN2021/107727, Jan. 26, 2022, 2 pgs.

(Continued)

*Primary Examiner* — Kerri L McNally
*Assistant Examiner* — Thang D Tran
(74) *Attorney, Agent, or Firm* — Morgan, Lewis & Bockius LLP

(57) ABSTRACT

This application provides an information processing method performed by a computing device. The method includes the following steps: acquiring free parking space information of a target path in a time period T1, the target path including N stop areas, the time period T1 being divided into K unit times; determining a free parking space change trend of the N stop areas in the time period T1 according to the free parking space information, and mining the free parking space change trend of the N stop areas in the time period T1 to obtain parking space prediction information; and performing traffic planning for a vehicle along the target path according to the parking space prediction information. The solution can well adapt to traffic scene requirements and improve the accuracy of traffic planning.

18 Claims, 11 Drawing Sheets

(58) Field of Classification Search
USPC .................................................... 340/932.2
See application file for complete search history.

(56) References Cited

U.S. PATENT DOCUMENTS

| | | | | |
|---|---|---|---|---|
| 11,144,848 | B2* | 10/2021 | Friedman | G06Q 10/0631 |
| 2006/0240781 | A1* | 10/2006 | Tabe | H04M 1/6083 |
| | | | | 455/66.1 |
| 2010/0250127 | A1* | 9/2010 | Hilbrandie | G01C 21/3492 |
| | | | | 701/533 |
| 2012/0072096 | A1* | 3/2012 | Chapman | G08G 1/0133 |
| | | | | 701/117 |
| 2012/0221230 | A1* | 8/2012 | Reilhac | G08G 1/096775 |
| | | | | 701/117 |
| 2013/0006516 | A1* | 1/2013 | Geurts | G01C 21/3617 |
| | | | | 701/410 |
| 2014/0032088 | A1* | 1/2014 | Chang | G08G 1/096775 |
| | | | | 701/117 |
| 2014/0036077 | A1 | 2/2014 | Nerayoff et al. | |
| 2015/0066368 | A1* | 3/2015 | McKenzie | G01C 21/3676 |
| | | | | 701/538 |
| 2016/0087899 | A1* | 3/2016 | Katevenis | H04L 47/22 |
| | | | | 370/230 |
| 2017/0154530 | A1* | 6/2017 | Irion | G08G 1/09623 |
| 2017/0219361 | A1* | 8/2017 | Mays | G08G 1/0112 |
| 2018/0276614 | A1* | 9/2018 | Blair, II | G08G 1/141 |
| 2019/0258263 | A1* | 8/2019 | Wendel | B60W 50/14 |
| 2020/0064139 | A1* | 2/2020 | Mieth | G08G 1/096844 |
| 2020/0080862 | A1* | 3/2020 | Pluciennik | G01C 21/3691 |
| 2020/0242934 | A1* | 7/2020 | Xu | G01C 21/3685 |
| 2020/0365015 | A1* | 11/2020 | Nguyen | G08G 1/0129 |
| 2020/0370911 | A1* | 11/2020 | Rolf | G08G 1/096805 |
| 2021/0276542 | A1* | 9/2021 | Mizuno | B62D 15/0285 |
| 2021/0346556 | A1* | 11/2021 | Manka | B60N 2/0025 |
| 2022/0097734 | A1* | 3/2022 | Limaye | G06V 10/44 |
| 2023/0074474 | A1* | 3/2023 | Imai | G06N 3/09 |

FOREIGN PATENT DOCUMENTS

| | | |
|---|---|---|
| CN | 105427596 A | 3/2016 |
| CN | 105513414 A | 4/2016 |
| CN | 105575162 A | 5/2016 |
| CN | 106779256 A | 5/2017 |
| CN | 110796857 A | 2/2020 |
| CN | 111462489 A | 7/2020 |
| CN | 111583635 A | 8/2020 |
| CN | 111882114 A | 11/2020 |
| CN | 112036757 A | 12/2020 |
| KR | 20200016541 A | 2/2020 |
| WO | WO 2016114191 A1 | 7/2016 |

OTHER PUBLICATIONS

Tencent Technology, WO, PCT/CN2021/107727, Jan. 26, 2022, 5 pgs.
Tencent Technology, IPRP, PCT/CN2021/107727, Oct. 24, 2023, 6 pgs.

* cited by examiner

INFORMATION PROCESSING METHOD AND APPARATUS, COMPUTER DEVICE AND STORAGE MEDIUM

CROSS-REFERENCE TO RELATED APPLICATIONS

This application is a continuation application of PCT Patent Application No. PCT/CN2021/107727, entitled "INFORMATION PROCESSING METHOD AND APPARATUS, COMPUTER DEVICE AND STORAGE MEDIUM" filed on Jul. 21, 2021, which claims priority to Chinese Patent Application No. 202110456768.X, entitled "INFORMATION PROCESSING METHOD AND APPARATUS, COMPUTER DEVICE AND STORAGE MEDIUM" filed on Apr. 26, 2021, all of which are incorporated herein by reference in their entirety.

FIELD OF THE TECHNOLOGY

This application relates to the technical field of Internet, and particularly relates to an information processing method and apparatus, a computer device and a storage medium.

BACKGROUND OF THE DISCLOSURE

With the urban development and rapid economic operation, the rapid increase in vehicle holdings (such as cars) has brought great challenges to the urban governance, parking spaces in stop areas (such as parking spaces in parking lots) and other infrastructure construction. How to make reasonable and effective allocation based on the construction resources, and make more full use of resources to solve traffic planning problems, including traffic congestion and planning of parking spaces in stop areas, have become important links which need to be solved in urban development. At present, the traffic planning problem is mainly solved by some prediction algorithms or prediction models of deep learning networks. It is found from practice that the current solution cannot well adapt to traffic scene requirements, and the accuracy and practicability of traffic planning are low.

SUMMARY

Embodiments of this application provide an information processing method and apparatus, a computer device and a storage medium, which can well adapt to traffic scene requirements and improve the accuracy of traffic planning.

In one aspect, an embodiment of this application provides an information processing method, which is applied to a computer device, and the method includes the following steps:
  acquiring free parking space information of a target path in a time period T1, the target path including N stop areas, the time period T1 being divided into K unit times; the free parking space information including free parking space data of each stop area in each unit time; and N and K both being positive integers;
  determining a free parking space change trend of the N stop areas in the time period T1 according to the free parking space information, and mining the free parking space change trend of the N stop areas in the time period T1 to obtain parking space prediction information; and
  performing traffic planning for a vehicle along the target path according to the parking space prediction information.

In one aspect, an embodiment of this application provides an information processing method, which is applied to a computer device, and the method includes the following steps:
  acquiring traffic flow information of a target path in a time period T1, the target path including M road sections, the time period T1 being divided into K unit times; the traffic flow information including traffic flow data of each road section in each unit time; and M and K both being positive integers;
  constructing traffic flow feature vectors of the M road sections in the time period T1 according to the traffic flow information, and clustering the traffic flow feature vectors to obtain road section prediction information, the road section prediction information including at least one of a congested road section or a non-congested road section; and
  performing traffic planning according to the road section prediction information.

In one aspect, an embodiment of this application provides an information processing apparatus, and the apparatus includes:
  an acquisition unit, configured to acquire free parking space information of a target path in a time period T1, the target path including N stop areas, the time period T1 being divided into K unit times; the free parking space information including free parking space data of each stop area in each unit time; and N and K both being positive integers;
  a processing unit, configured to determine a free parking space change trend of the N stop areas in the time period T1 according to the free parking space information, and mine the free parking space change trend of the N stop areas in the time period T1 to obtain parking space prediction information; and
  the processing unit being further configured to perform traffic planning for a vehicle along the target path according to the parking space prediction information.

In one aspect, an embodiment of this application provides an information processing apparatus, and the apparatus includes:
  an acquisition unit, configured to acquire traffic flow information of a target path in a time period T1, the target path including M road sections, the time period T1 being divided into K unit times; the traffic flow information including traffic flow data of each road section in each unit time; and M and K both being positive integers;
  a processing unit, configured to construct traffic flow feature vectors of the M road sections in the time period T1 according to the traffic flow information, and cluster the traffic flow feature vectors to obtain road section prediction information, the road section prediction information including at least one of a congested road section or a non-congested road section; and
  the processing unit being further configured to perform traffic planning according to the road section prediction information.

In one aspect, an embodiment of this application provides a computer device. The computer device includes a memory and a processor; the memory stores a computer program; and the computer program, when executed by the processor, causes the processor to execute the above-mentioned information processing method.

In one aspect, an embodiment of this application provides a computer-readable storage medium. The computer-readable storage medium stores a computer program, and the computer program, when read and executed by a processor of a computer device, causes the computer device to execute the above-mentioned information processing method.

In one aspect, an embodiment of this application provides a computer program product or a computer program. The computer program product or the computer program includes a computer instruction, and the computer instruction is stored in a computer-readable storage medium. A processor of a computer device reads the computer instruction from the computer-readable storage medium, and the processor executes the computer instruction, causing the computer device to execute the above-mentioned information processing method.

In this embodiment of this application, the free parking space information objectively reflects the real condition of a traffic scene, and the parking space prediction information is obtained by deeply mining the free parking space information, so that the parking space prediction information is obtained after fully mining the real condition of the traffic scene, as a result, the accuracy of the parking space prediction information is improved, and the traffic planning performed based on the parking space prediction information can well adapt to the requirements of the traffic scene, and the traffic planning made in this way is more accurate and more instructive.

In this embodiment of this application, the traffic flow information objectively reflects the real condition of the traffic scene, and the road section prediction information is obtained by analyzing and clustering the traffic flow information, so that the road section prediction information is obtained after fully mining the real condition of the traffic scene, as a result, the accuracy of the road section prediction information is improved, and the traffic planning performed based on the road section prediction information can well adapt to the requirements of the traffic scene, and the traffic planning made in this way is more accurate and more instructive.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show some embodiments of this application, and a person of ordinary skill in the art may still derive other drawings from these accompanying drawings without creative efforts.

DESCRIPTION OF EMBODIMENTS

Figure 1:
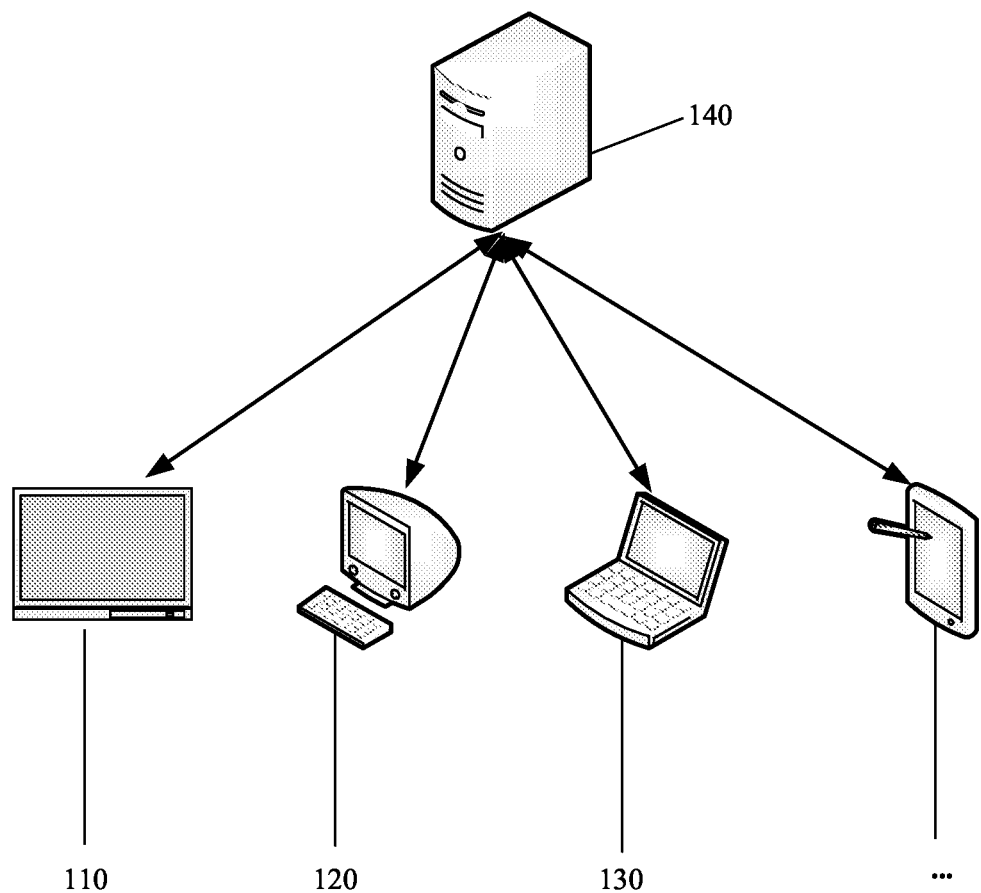
FIG. 1 is a schematic architecture diagram of an information processing system according to an embodiment of this application.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with this application. On the contrary, the implementations are merely examples of apparatuses and methods that are described in detail in the appended claims and that are consistent with some aspects of this application.

According to an embodiment of this application, sequence mode mining and integrated clustering processing are fused in a traffic planning process; because free parking space information and traffic flow information objectively reflect the real condition of a traffic scene, parking space prediction information is obtained by deeply mining and analyzing the free parking space information based on a sequence mode, and road section prediction information is obtained by performing analysis and integrated clustering processing on the traffic flow information, the parking space prediction information and the road section prediction information are obtained after fully mining the real condition of the traffic scene. Therefore, traffic planning performed based on the parking space prediction information and the road section prediction information can well adapt to the requirements of the traffic scene, and as a result, the traffic planning made in this way is more accurate and has higher reference value and practical significance in the application fields of traffic path planning, urban resource configuration and map scientific navigation.

This application relates to a process of determining a free parking space change trend of N stop areas in a time period T1 according to free parking space data, and mining the free parking space change trend of the N stop areas in the time period T1 to obtain the parking space prediction information of a target path; this application further relates to a process of constructing traffic flow feature vectors of M road sections in the time period T1 according to the traffic flow information, and clustering the traffic flow feature vectors to obtain the road section prediction information; the two processes both involve large-scale computation, and need large computation power and storage space, so that in a feasible implementation of this application, a computer device is configured to acquire sufficient computation power and storage space through a cloud computation technology, and then execute operations of determining the parking space prediction information and the road section prediction information of the target path involved in this application.

In some embodiments, an information processing method in this application is packaged into an artificial intelligence cloud service, and an interface is exposed to the outside. In a case of using a traffic planning function involved in this application in a certain service scene, this interface is called to complete the traffic planning function (such as path planning or parking space planning) of the target path.

A blockchain is a novel application mode of computer technologies such as distributed data storage, point-to-point transmission, consensus mechanism and encryption algorithm. The blockchain is essentially a decentralized database and is a string of data blocks generated by associating through a cryptography method, and each data block contains information of a batch of network transactions and is configured to verify the effectiveness (anti-counterfeiting) of the information and generate a next block. The blockchain includes a blockchain underlying platform, a platform product service layer and an application service layer.

Information processing solutions of this application can be combined with the blockchain technology, for example, the traffic flow information and the free parking space information are uploaded to a blockchain to be stored, and it can be guaranteed that the information on the blockchain is not prone to being tampered.

An embodiment of this application is widely applied to the fields of traffic path planning, map path navigation and urban resource management and configuration. For example, in the application to urban resource management and configuration, state distribution such as traffic flow data and free parking space data of a traffic area is mined and analyzed, more traffic resources and parking spaces are configured in an area with relatively large traffic flow, and thus the problems of traffic pressure and parking difficulty in these areas can be reduced. For another example, in the application to map path navigation, the traffic condition between a departure place and a destination place can be recognized and predicted in real time, so that a more scientific and effective path reference can be provided according to the traffic congestion condition, the traffic duration can be shortened, and the travel efficiency can be improved. Of course, in addition, applications related to traffic flow area state prediction and parking path planning all belong to potential application scenes of this application.

Referring to FIG. 1, FIG. 1 is a schematic architecture diagram of an information processing system according to an embodiment of this application. The schematic architecture diagram of the information processing system includes: a server 140 and a computer device cluster, and the computer device cluster includes: a computer device 110, a computer device 120, a computer device 130, and so on. The computer device cluster and the server 140 are directly or indirectly connected in a wired or wireless communication mode, and no limitation is made in this application.

The server 140 shown in FIG. 1 can be an independent physical server, can also be a server cluster composed of a plurality of physical servers, or a distributed system, and can also be a cloud server for providing basic cloud computing services such as cloud services, cloud databases, cloud computing, cloud functions, cloud storage, network services, cloud communication, middleware services, domain name services, security services, content delivery network (CDN), big data and artificial intelligence platforms.

The computer device 110, the computer device 120, the computer device 130, etc. shown in FIG. 1 can be intelligent devices with an information processing function such as a mobile phone, a tablet computer, a notebook computer, a pocket computer, a mobile internet device (MID), a vehicle, a vehicle-mounted device, a roadside device, an aircraft and a wearable device (such as an intelligent watch, an intelligent bracelet and a pedometer).

In a possible implementation, the computer device 110 is taken as an example. The computer device 110 acquires free parking space information and traffic flow information of a target path in a time period T1. The target path includes M road sections, the target path includes N stop areas, and the time period is divided into K unit time. The traffic flow information includes traffic flow data of each road section in each unit time. The free parking space information includes free parking space data of each stop area in each unit time. M, N and K are all positive integers.

The target path is any path in a traffic scene, such as any path inputted in an electronic map and a navigation tool, or any path involved in actual transportation. A stop area is an area for transportation means stopping, for example, the transportation means are automobiles, and the stop area refers to a parking lot; and for another example, the transportation means are ships, and the stop area refers to a wharf. The parking spaces refer to areas which are arranged in the stop area and used for standardizing stopping positions, such as parking spaces in the parking lot, and mooring spaces in the wharf. The free parking spaces refer to parking spaces which are not occupied, such as the free parking spaces in the parking lot. The free parking space data includes the number of free parking spaces, for example, the free parking space data of a certain stop area A in a certain unit time includes the number (such as 50) of free parking spaces in the stop area A in the unit time. The free parking space data further includes specific positions of the free parking spaces, for example, the free parking space data of the certain stop area A in the certain unit time further includes distribution positions of the free parking spaces in the stop area A (for example, a certain free parking space is at No. 104 in a G area at B1 of the stop area A). The traffic flow data includes the number of transportation means passing through, for example, when 200,000 vehicles pass through a certain road section A in a certain unit time, the traffic flow data of the road section A in the unit time includes the number of 200,000 transportation means passing through. The traffic flow data further includes attribute data of transportation means passing through, for example, when a certain five-seat car passes through the certain road section A in a certain unit time, the traffic flow data of the road section A in the unit time further includes attribute data of the car (namely, five-seat car).

The computer device 110 is configured to transmit the free parking space information and the traffic flow information to the server 140. After acquiring the free parking space information and the traffic flow information, the server 140 is configured to determine a free parking space change trend of N stop areas in a time period according to the free parking space information, and mine the free parking space change trend of the N stop areas in the time period T1 to obtain parking space prediction information. The parking space prediction information may include information of the stop areas with free parking spaces, so as to provide a parking space recommendation service or a parking space planning service. The server 140 is further configured to construct traffic flow feature vectors of M road sections in the time period T1 according to the traffic flow information, and cluster the traffic flow feature vectors to obtain road section prediction information. The road section prediction information includes at least one of some congested road sections or non-congested road sections obtained through prediction, so as to provide a road section recommendation service or a path planning service. Then, the server 140 is configured to transmit the parking space prediction information and the road section prediction information to the computer device 110, and then the computer device 110 is configured to perform traffic planning for a vehicle along the target path according to the parking space prediction information and the road section prediction information.

Of course, the operations of determining a free parking space change trend of N stop areas in the time period T1 according to the free parking space information, and mining the free parking space change trend of the N stop areas in the time period T1 to obtain parking space prediction information of the target path, constructing traffic flow feature vectors of M road sections in the time period T1 according to the traffic flow information, and clustering the traffic flow feature vectors to obtain road section prediction information are not necessarily executed by the server 140, and it can also be executed by the computer device 110 or any other computer device in the computer device cluster. Moreover, the operation of performing traffic planning for a vehicle along the target path according to the parking space prediction information and the road section prediction information is also not necessarily executed by the computer device 110, and it can also be executed by the server 140.

In a possible implementation, the process of obtaining the parking space prediction information of the target path according to the free parking space information and the process of obtaining the road section prediction information according to the traffic flow information can be independently executed; for example, the computer device 110 only obtains the parking space prediction information of the target path according to the free parking space information and performs traffic planning for a vehicle along the target path according to the parking space prediction information, but no longer obtains the road section prediction information according to the traffic flow information; or the computer device 110 only obtains the road section prediction information according to the traffic flow information and performs traffic planning according to the road section prediction information, but no longer obtains the parking space prediction information of the target path according to the free parking space information.

In a possible implementation, the information processing system provided in this embodiment of this application is deployed at a node of the blockchain; for example, the server 140 and each computer device included in the computer device cluster are all treated as node devices of the blockchain to jointly form a blockchain network. Therefore, the information processing process for the traffic flow data and the free parking space data in this application is executed on the blockchain, so that the fairness and justice of the information processing process are ensured, meanwhile, the information processing process has traceability, and the safety of the information processing process is improved.

It is to be understood that the schematic system architecture diagram described in the embodiments of this application is for more clearly describing the technical solutions in the embodiments of this application, and does not constitute a limitation on the technical solutions provided in the embodiments of this application. A person of ordinary skill in the art may learn that, with evolution of the system architecture and appearance of new service scenes, the technical solutions provided in the embodiments of this application also apply to similar technical problems.

The application scene of the information processing method provided in this embodiment of this application is detailed in conjunction with the accompanying drawings as follows.

Figure 2A:
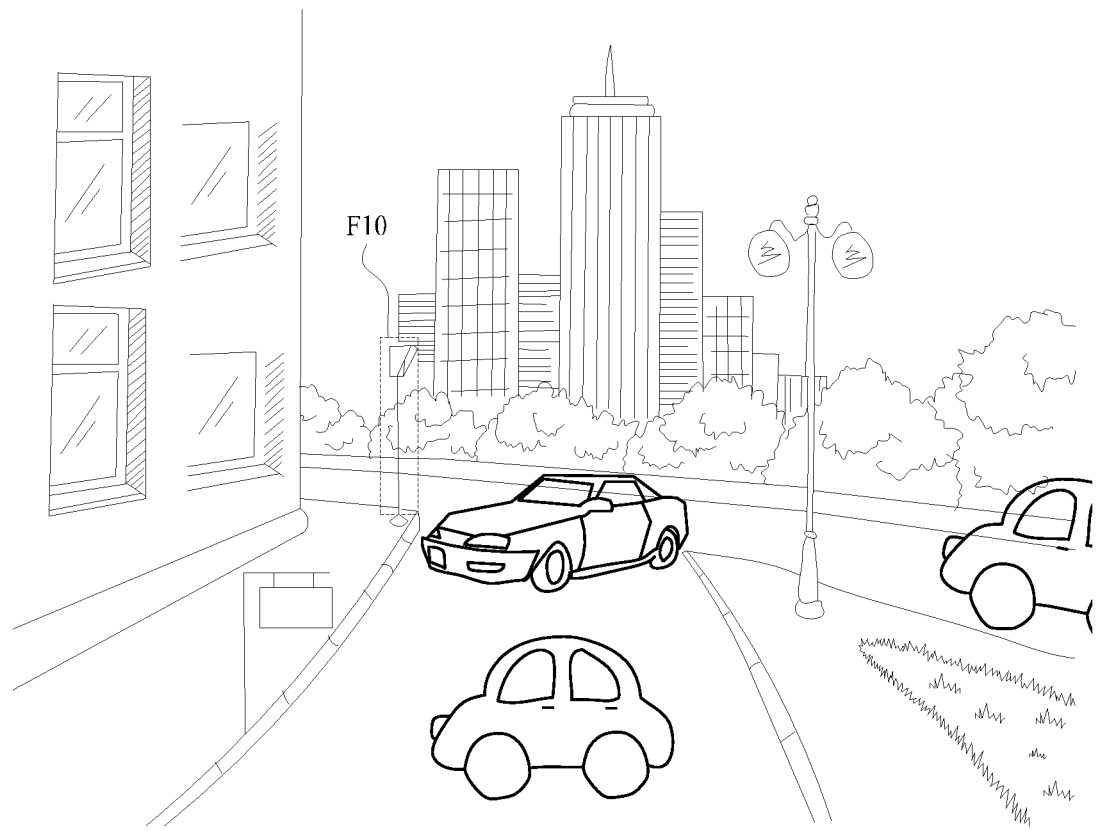
FIG. 2a is a schematic scene diagram of urban road traffic according to an embodiment of this application.

As shown in FIG. 2*a*, FIG. 2*a* is a schematic scene diagram of urban road traffic according to an embodiment of this application. As shown in FIG. 2*a*, in the urban traffic road, the free parking space information of a stop area in each time period (such as per hour or per 24 h) and the traffic flow information of each road section in the urban road traffic in 24 h are recognized and collected in real time through intelligent devices such as a traffic camera (for example, F10), and the traffic flow information and the free parking space information which are obtained in real time are subjected to standardization processing respectively. The standardization processing includes but is not limited to normalization processing, ETL technical processing, data cleaning processing, and so on. The extract-transform-load (ETL) technical processing refers to extracting, transforming and loading the traffic flow information and the free parking space information from a source end to a destination end. The data cleaning processing includes rechecking and verifying the traffic flow information and the free parking space information, such as supplementing incomplete information, deleting repeated information and correcting error information. Of course, in addition to being collected in real time through the traffic camera, the traffic flow information and the free parking space information can also be obtained from historical traffic data stored in an intelligent traffic cloud platform. The corresponding traffic flow data of each road section of each path in historical time and the corresponding free parking space data of each stop area of each path in the historical time are stored in the intelligent traffic cloud platform. The time period is set in a self-defined manner according to user requirements or is set in advance, and no specific limitation is made in this application.

Figure 2B:
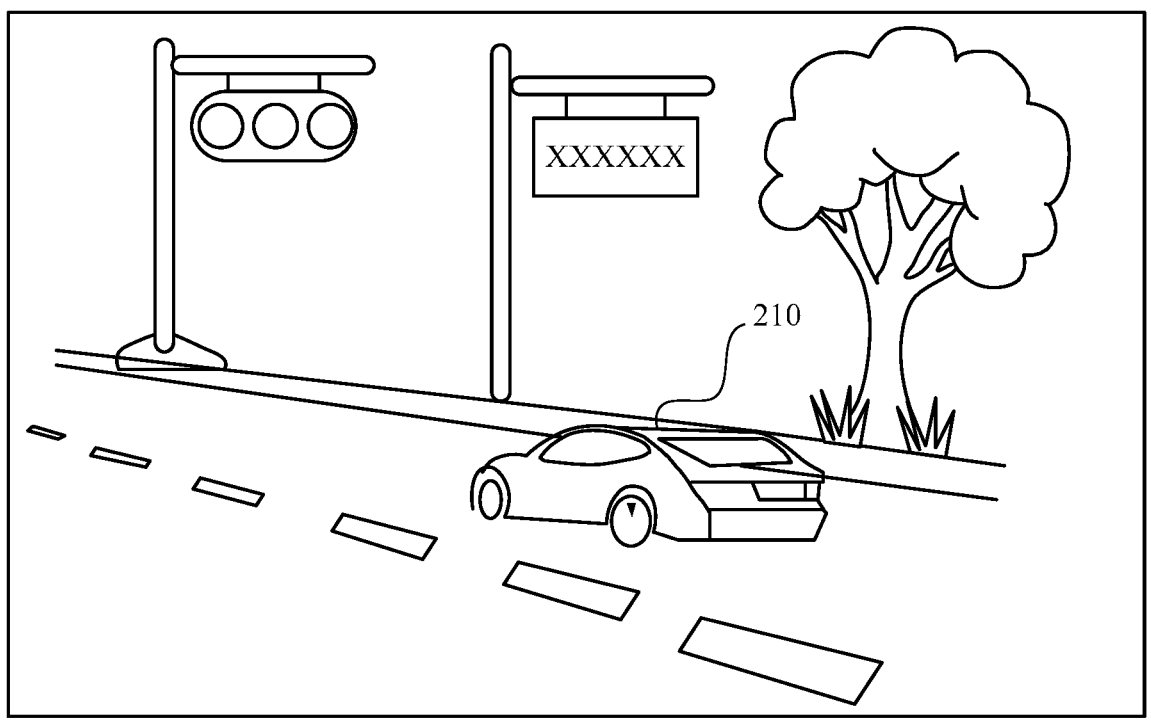
FIG. 2b is a schematic application scene diagram of urban road traffic according to an embodiment of this application.
Figure 2C:
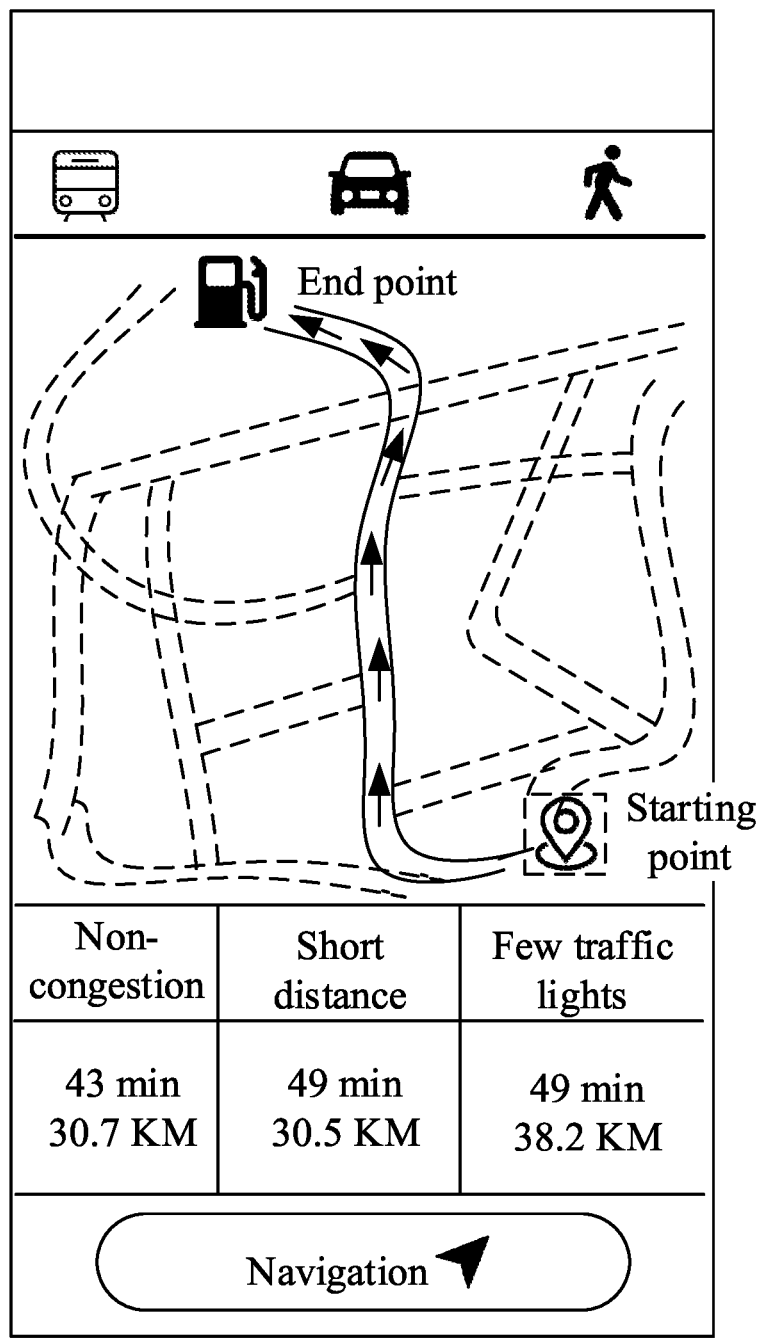
FIG. 2c is a schematic scene diagram of navigation planning according to an embodiment of this application.

In one application scene of this application, referring to FIG. 2*b*, FIG. 2*b* is a schematic application scene diagram of urban road traffic according to an embodiment of this application. As shown in FIG. 2*b*, a user inputs a departure place and a destination place through a navigation system in a vehicle-mounted device in a target vehicle (210) while driving on an urban road, and then the vehicle-mounted device provides navigation planning information for the user according to the method provided in this application. Referring to FIG. 2*c*, FIG. 2*c* is a schematic scene diagram of navigation planning according to an embodiment of this application. As shown in FIG. 2*c*, the navigation planning information includes one or more travel paths, and non-congested road sections in the time period can be recommended to the user as alternative travel paths through the solution of this application. Of course, besides recommending the non-congested road sections, the path with the shortest distance and the path with the fewest traffic lights can also be recommended to the user, and the user can select the corresponding travel path according to own needs. In addition, the plurality of recommended paths are arranged according to a recommendation sequence, for example, the non-congested paths are ranked first for selection, the paths with short distance are ranked second, and the paths with fewer traffic lights are ranked third. For example, as shown in FIG. 2*c*, the navigation planning information recommended to the user based on this application includes 3 travel paths and path information (such as passing time and passing distance) corresponding to each path between the departure place and the destination place, the displayed target paths can be the best selected non-congested paths provided for the user, the first recommended path is a non-congested path, and its corresponding passing time is 43 min, and the passing distance is 30.7 KM; the second recommended path is a path with shorter distance, its corresponding passing time is 49 min, and the passing distance is 30.5 KM; and the third path is a path with fewer traffic lights, and its corresponding passing time is 49 min, and the passing distance is 38.2 KM.

In one application scene of this application, after the road section prediction information of the target path is computed, the road section prediction information of the target path is stored in the traffic management cloud platform (the road section prediction information can be updated periodically), and then one or more non-congested road sections included in the target path within a target time interval are acquired according to the road section prediction information of the target path. In response to that the user submits a path planning request, the one or more non-congested road sections will be recommended to the user. For example, as shown in FIG. 2b, the user inputs the departure place and the destination place through the navigation system in the vehicle-mounted device in the target vehicle (210) while driving on the urban road, then determines a path between the departure place and the destination place as the target path, and acquires the road section prediction information of the target path. The road section prediction information includes congested road sections and non-congested road sections of a plurality of road sections included in the target path in each time interval.

For example, the target path is a path 1, and the path 1 includes 5 road sections, namely a road section a, a road section b, a road section c, a road section d and a road section e. At 8:00 a.m. to 9:00 a.m., the road section a and the road section b are non-congested road sections, and the road section c, the road section d and the road section e are congested road sections; at 1:00 p.m. to 2:00 p.m., the road section a and the road section b are congested road sections, and the road section c, the road section d and the road section e are non-congested road sections; at 0:00 a.m. to 1:00 a.m., the road section a is a congested road section, and the road section b, the road section c, the road section d and the road section e are non-congested road sections; and at 5:00 a.m. to 6:00 a.m., the road section a, the road section b and the road section c are congested road sections, and the road section d and the road section e are non-congested road sections, etc. In response to that the user submits a navigation planning request in real time, the background will determine which time interval the request time is in according to the request time, and recommend the non-congested road sections in the path in the time interval to the user. For example, the user submits a path planning request at 8:00 a.m. to 9:00 a.m. in the morning rush hours, it is determined that the road section a and the road section b are the non-congested road sections according to the road section prediction information of the path 1, and the road section a and the road section b are recommended to the user at the moment, so that the rush hours are avoided, the travel efficiency is improved, and the driving experience of the user is improved.

In one application scene of this application, the number of the non-congested road sections included in the target path in each time interval can be acquired according to the road section prediction information of the target path, and the time interval including the largest number of the non-congested road sections is determined as a target time interval. According to the parking space prediction information of the target path, a free parking space change frequent sequence of the target time interval is acquired, one or more to-be-recommended stop areas in the target path are determined according to the free parking space change frequent sequence of the target time interval, and the determined one or more to-be-recommended stop areas are recommended to the user.

Figure 2D:
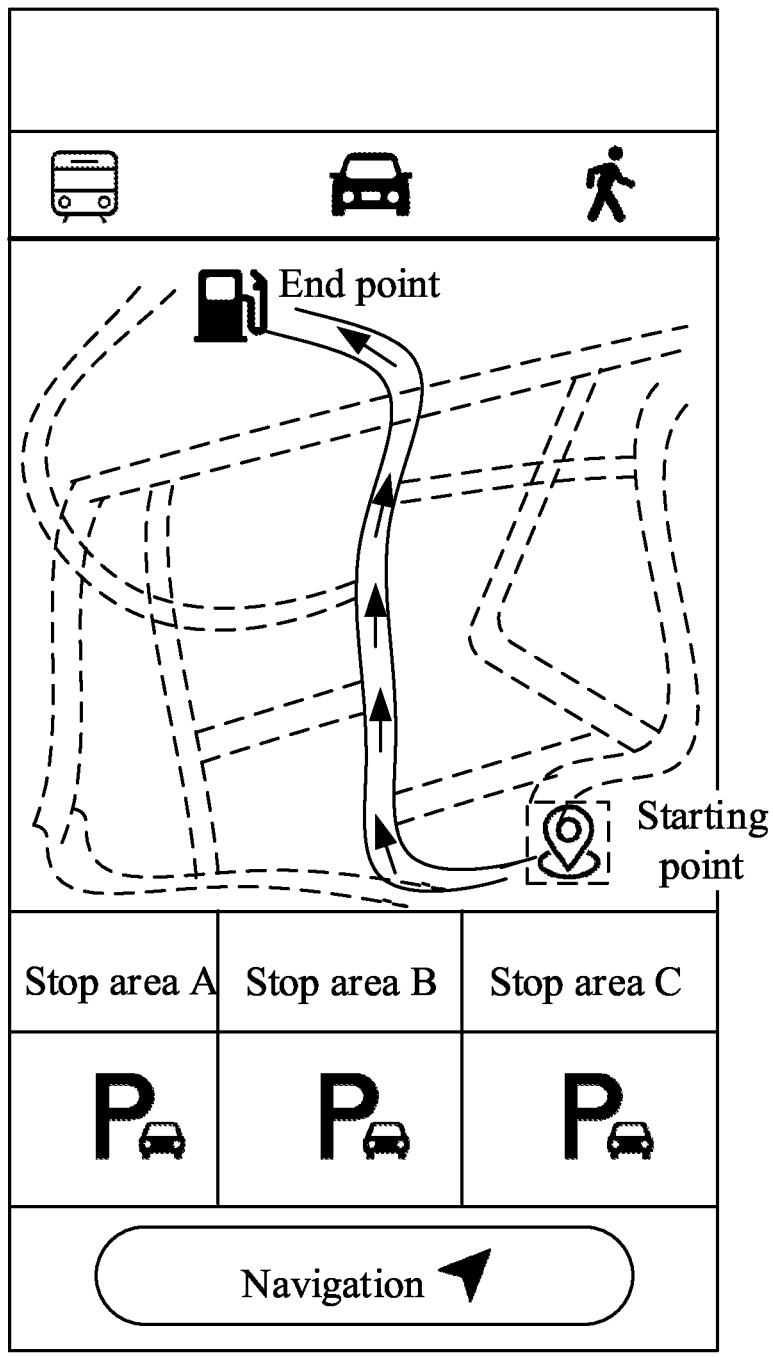
FIG. 2d is a schematic scene diagram of stop area planning according to an embodiment of this application.

For example, the congested road sections and the non-congested road sections included by the road sections of the path 1 in each hour in a day are computed according to this application, for example, the path 1 includes 5 road sections, namely a road section a, a road section b, a road section c, a road section d and a road section e. At 8:00 a.m. to 9:00 a.m., the road section a and the road section b are non-congested road sections, and the road section c, the road section d and the road section e are congested road sections; at 1:00 p.m. to 2:00 p.m., the road section a and the road section b are congested road sections, and the road section c, the road section d and the road section e are non-congested road sections; at 0:00 a.m. to 1:00 a.m., the road section a is a congested road section, and the road section b, the road section c, the road section d and the road section e are non-congested road sections; and at 5:00 a.m. to 6:00 a.m., the road section a, the road section b and the road section c are congested road sections, and the road section d and the road section e are non-congested road sections, etc. Within these 24 time intervals, the non-congested road sections included in each time interval are computed, for example, at 8:00 a.m. to 9:00 a.m., the included non-congested road sections are the road section a and the road section b; at 1:00 p.m. to 2:00 p.m., the included non-congested road sections are the road section c, the road section d and the road section e; and at 0:00 a.m. to 1:00 a.m., the included non-congested road sections are the road section b, the road section c, the road section d and the road section e, etc. At 0:00 a.m. to 1:00 a.m., the path 1 includes the most non-congested road sections, thus it can be determined that at 0:00 a.m. to 1:00 a.m., the path 1 is the least congested, and the free parking space change frequent sequence at 0:00 a.m. to 1:00 a.m. can be obtained according to the parking space prediction information of the path 1; and in response to assuming that B increases-C increases-D decreases-F decreases, stop areas B and C are recommended to the user as the to-be-recommended stop areas within the time period of 0:00 a.m. to 1:00 a.m. Referring to FIG. 2d, FIG. 2d is a schematic scene diagram of stop area planning according to an embodiment of this application. As shown in FIG. 2d, the parking space prediction information of the target path can be determined between a navigation starting point and a navigation end point; and through the solution of this application, one or more to-be-recommended stop areas, such as the stop areas A, B and C, in the target path within the target time interval can be recommended to the user.

Based on the above analysis, the state distribution of the traffic areas is mined and analyzed in urban resource allocation, thus more traffic resources and parking spaces are allocated in areas with large traffic flow, and the problems of traffic pressure and parking difficulty in these areas can be reduced; and in the application to map path navigation, the traffic condition between the departure place and the destination place is recognized and predicted in real time, and a more scientific and effective path reference is provided according to the traffic congestion condition, so that the traffic duration can be shortened, and the efficiency is improved.

Figure 3:
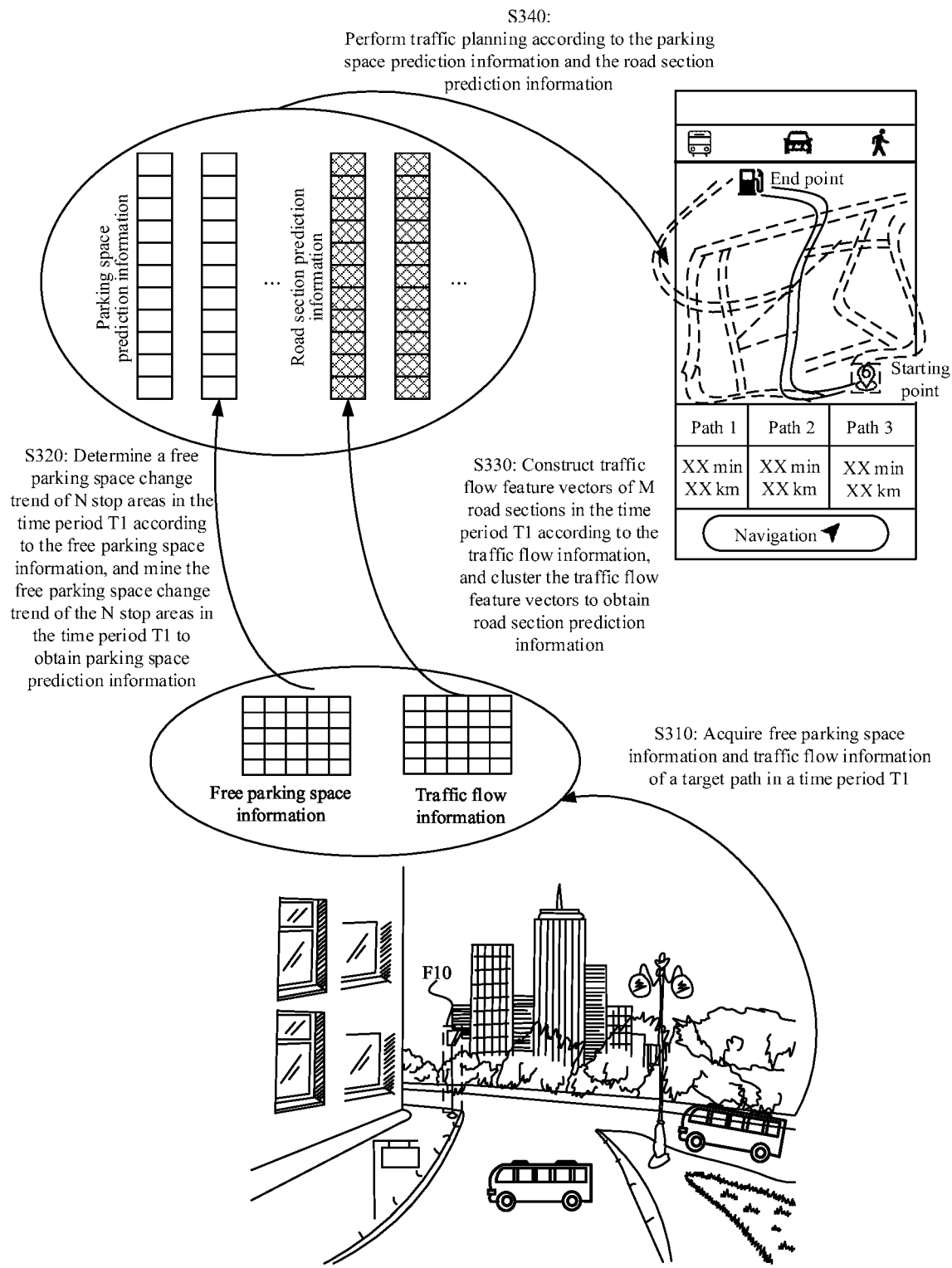
FIG. 3 is a schematic flowchart of an information processing method according to an embodiment of this application.

Based on the above analysis, the information processing of this application is described below in combination with FIG. 3. Referring to FIG. 3, FIG. 3 is a schematic flowchart of an information processing method according to an embodiment of this application. The information processing method can be applied to a computer device. The computer device can be a vehicle-mounted device, an intelligent phone, a tablet computer, an intelligent wearable device and other intelligent devices; the computer device can also be implemented by cooperation of the computer device and a server; and the computer device can also be the server. As shown in FIG. 3, the information processing method can include steps S310 to S340. In which:

S310: Acquire free parking space information and traffic flow information of a target path in a time period T1, the target path including M road sections, the target path including N stop areas, the time period being divided into K unit times; the traffic flow information including traffic flow data of each road section in each unit time; the free parking space information including free parking space data of each stop area in each unit time; and M, N and K all being positive integers.

In this application, the time period T1 can be set as needed, for example, the time period is one day, one month, and so on. The unit time can be set according to actual requirements, for example, the unit time can be 1 h, 10 min, 2 h, and so on. The time period of one day is taken as an example, the day can be divided into 24 unit times, and each unit time is one hour. The stop area, for example, can be a parking lot. The target path can be any path in urban road traffic, for example, any path from a road starting point to a road end point can be used as the target path in this application.

For example, as shown in FIG. 2a, in the urban traffic road, the free parking space data of the stop area in each time period (such as per hour or per 24 h) and the traffic flow data of each road section in the urban road traffic in 24 h can be recognized and collected in real time through intelligent devices such as a traffic camera (for example, F10), and the traffic flow data and the free parking space data which are obtained in real time are standardized respectively. Of course, in addition to being collected in real time through the traffic camera, the traffic flow data and the free parking space data can also be obtained from historical traffic data stored in an intelligent traffic cloud platform. The corresponding traffic flow data of each road section of each path in historical time and the corresponding free parking space data of each stop area of each path in the historical time are stored in the intelligent traffic cloud platform. The time period and the unit time can be set in a self-defined manner according to user requirements or can be set in advance, and no specific limitation is made in this application.

Then, the process of collecting the traffic flow information and the free parking space information is introduced in detail by one example. Assuming that the transportation means is a car, the stop area refers to a parking area (such as an indoor or open parking lot), and the free parking space data refers to free parking space data of the parking area.

I. Acquire Free Parking Space Information:

For example, assuming that the free parking space data of a certain road section of a certain path at each unit time (such as one hour) in a time period (such as one day, including 24 unit times) is collected as shown in Table 1:

TABLE 1

24-hour free parking space condition of a certain stop area of a certain path

| Path | Stop area | Time | Free parking space (pcs) |
|---|---|---|---|
| Path 1 | Stop area A | 0:00 a.m. | 20 |
| Path 1 | Stop area A | 1:00 a.m. | 15 |
| Path 1 | Stop area A | 2:00 a.m. | 26 |
| Path 1 | Stop area A | 3:00 a.m. | 9 |
| Path 1 | Stop area A | 4:00 a.m. | 5 |
| Path 1 | Stop area A | 5:00 a.m. | 10 |
| Path 1 | Stop area A | 6:00 a.m. | 50 |
| Path 1 | Stop area A | 7:00 a.m. | 76 |
| Path 1 | Stop area A | 8:00 a.m. | 90 |
| Path 1 | Stop area A | 9:00 a.m. | 120 |
| Path 1 | Stop area A | 10:00 a.m. | 100 |
| Path 1 | Stop area A | 11:00 a.m. | 70 |
| Path 1 | Stop area A | 12:00 p.m. | 90 |
| Path 1 | Stop area A | 1:00 p.m. | 80 |
| Path 1 | Stop area A | 2:00 p.m. | 75 |
| Path 1 | Stop area A | 3:00 p.m. | 130 |
| Path 1 | Stop area A | 4:00 p.m. | 60 |
| Path 1 | Stop area A | 5:00 p.m. | 30 |
| Path 1 | Stop area A | 6:00 p.m. | 154 |
| Path 1 | Stop area A | 7:00 p.m. | 170 |
| Path 1 | Stop area A | 8:00 p.m. | 164 |
| Path 1 | Stop area A | 9:00 p.m. | 90 |
| Path 1 | Stop area A | 10:00 p.m. | 70 |
| Path 1 | Stop area A | 11:00 p.m. | 40 |

Table 1 shows the free parking space data of the stop area A of the path 1 in each hour within 24 h. In a possible implementation, the path 1 may further include other stop areas such as a stop area B, and the other stop areas can refer to the method shown in Table 1 to mark the free parking space data of the other stop areas (such as the stop area B) of the path 1 in each hour within 24 h.

In a possible implementation, each path may include one or more stop areas, and each path includes one or more stop areas refers to: one or more stop areas are arranged in the path and the car may pass through these stop areas when running in this path. A mapping relationship between the paths and the stop areas is shown in Table 2:

TABLE 2

Mapping relationship between paths and stop areas

| Path | Stop area |
|---|---|
| Path 1 | Stop area A |
| Path 1 | Stop area B |
| Path 1 | Stop area C |
| Path 1 | Stop area D |
| Path 1 | Stop area E |
| Path 1 | Stop area F |
| Path 2 | Stop area A |
| ... | ... |

As shown in Table 2, the stop areas to be passed in the whole path 1 include: totally 6 stop areas, namely, the stop area A, the stop area B, the stop area C, the stop area D, the stop area E and the stop area F. Similarly, the stop areas needing to be passed in the whole path 2 include the stop area A . . . . The number of the stop areas included in each path can be the same or different, for example, the path 1 may include 5 stop areas, and the path 2 may include 7 stop areas; and in addition, the stop areas included in each path may be intersected, for example, the path 1 and the path 2 may both include the stop area A.

Then, the corresponding free parking space data of each stop area in the same unit time can be determined as a free parking space sequence corresponding to the unit time based on the corresponding free parking space data of each stop area in each unit time (per hour) in the time period T1 (24 h), as shown in Table 3:

TABLE 3

Mapping relationship between paths and free parking spaces in each stop area

| Path | Time | Stop area A | Stop area B | Stop area C | Stop area D | Stop area E | Stop area F | Free parking space sequence of A-B-C-D-E-F stop areas |
|---|---|---|---|---|---|---|---|---|
| Path 1 | 0:00 a.m. | 20 | 201 | 190 | 262 | 205 | 450 | 20-201-190-262-205-450 |
| Path 1 | 1:00 a.m. | 15 | 243 | 241 | 313 | 84 | 474 | 15-243-241-313-84-474 |
| Path 1 | 2:00 a.m. | 26 | 108 | 446 | 204 | 112 | 439 | 26-108-446-204-112-439 |
| Path 1 | 3:00 a.m. | 9 | 436 | 93 | 435 | 400 | 359 | 9-436-93-435-400-359 |
| Path 1 | 4:00 a.m. | 5 | 259 | 216 | 191 | 81 | 5 | 5-259-216-191-81-5 |
| Path 1 | 5:00 a.m. | 10 | 347 | 271 | 288 | 244 | 365 | 10-347-271-288-244-365 |
| Path 1 | 6:00 a.m. | 50 | 86 | 473 | 235 | 105 | 444 | 50-86-473-235-105-444 |
| Path 1 | 7:00 a.m. | 76 | 310 | 314 | 16 | 140 | 266 | 76-310-314-161-140-266 |
| Path 1 | 8:00 a.m. | 90 | 79 | 153 | 402 | 361 | 410 | 90-79-153-402-361-410 |
| Path 1 | 9:00 a.m. | 120 | 308 | 330 | 224 | 440 | 207 | 120-308-330-224-440-207 |
| Path 1 | 10:00 a.m. | 100 | 482 | 335 | 46 | 216 | 409 | 100-482-335-46-216-409 |
| Path 1 | 11:00 a.m. | 70 | 219 | 490 | 313 | 275 | 444 | 70-219-490-313-275-444 |
| Path 1 | 12:00 p.m. | 90 | 177 | 58 | 227 | 63 | 482 | 90-177-58-227-63-482 |
| Path 1 | 1:00 p.m. | 80 | 158 | 326 | 222 | 381 | 358 | 80-158-326-222-381-358 |
| Path 1 | 2:00 p.m. | 75 | 377 | 478 | 177 | 267 | 18 | 75-377-478-177-267-18 |
| Path 1 | 3:00 p.m. | 130 | 346 | 303 | 125 | 38 | 213 | 130-346-303-125-38-213 |
| Path 1 | 4:00 p.m. | 60 | 38 | 336 | 56 | 26 | 181 | 60-38-336-56-26-181 |
| Path 1 | 5:00 p.m. | 30 | 49 | 334 | 423 | 164 | 278 | 30-49-334-423-164-278 |
| Path 1 | 6:00 p.m. | 154 | 84 | 280 | 350 | 306 | 345 | 154-84-280-350-306-345 |
| Path 1 | 7:00 p.m. | 170 | 308 | 183 | 497 | 165 | 265 | 170-308-183-497-165-265 |
| Path 1 | 8:00 p.m. | 164 | 203 | 137 | 357 | 328 | 278 | 164-203-137-357-328-278 |
| Path 1 | 9:00 p.m. | 90 | 422 | 117 | 456 | 241 | 434 | 90-422-117-456-241-434 |
| Path 1 | 10:00 p.m. | 70 | 150 | 438 | 385 | 227 | 176 | 70-150-438-385-227-176 |
| Path 1 | 11:00 p.m. | 40 | 426 | 263 | 126 | 216 | 201 | 40-426-263-126-216-201 |

As shown in Table 3, a corresponding free parking space sequence of the path 1 in each unit time can be obtained. One free parking space sequence corresponds to one unit time; each free parking space sequence includes a plurality of numerical values, and each numerical value represents free parking space data of each stop area in the corresponding unit time; for example, if the unit time is 0:00 a.m., the corresponding free parking space sequence will be 20-201-190-262-205-450, each numerical value in the free parking space sequence represents the free parking space data of each stop area at 0:00 a.m., for example, the numerical value 20 in the free parking space sequence represents that the number of free parking spaces in the stop area A at 0:00 a.m. is 20; if the unit time is 1:00 a.m., the corresponding free parking space sequence will be 15-243-241-313-84-474, each numerical value in the free parking space sequence represents the free parking space data of each stop area at 1:00 a.m., for example, the numerical value 15 in the free parking space sequence represents that the number of free parking spaces in the stop area A at 1:00 a.m. is 15; and so on.

II. Acquire Traffic Flow Information:

For example, assuming that traffic flow data (such as the number of vehicles passing through a certain road section) of the road section in a certain path in each unit time (for example, one hour) within a time period (for example, one day, including 24 unit times) is collected as shown in Table 4:

TABLE 4

Traffic flow data of a certain road section in a certain path

| Path | Road section | Time | Traffic flow data (ten thousand) |
|---|---|---|---|
| Path 1 | Road section A | 0:00 a.m. | 20 |
| Path 1 | Road section A | 1:00 a.m. | 15 |
| Path 1 | Road section A | 2:00 a.m. | 26 |

TABLE 4-continued

Traffic flow data of a certain road section in a certain path

| Path | Road section | Time | Traffic flow data (ten thousand) |
|---|---|---|---|
| Path 1 | Road section A | 3:00 a.m. | 9 |
| Path 1 | Road section A | 4:00 a.m. | 5 |
| Path 1 | Road section A | 5:00 a.m. | 10 |
| Path 1 | Road section A | 6:00 a.m. | 50 |
| Path 1 | Road section A | 7:00 a.m. | 76 |
| Path 1 | Road section A | 8:00 a.m. | 90 |
| Path 1 | Road section A | 9:00 a.m. | 120 |
| Path 1 | Road section A | 10:00 a.m. | 100 |
| Path 1 | Road section A | 11:00 a.m. | 70 |
| Path 1 | Road section A | 12:00 p.m. | 90 |
| Path 1 | Road section A | 1:00 p.m. | 80 |
| Path 1 | Road section A | 2:00 p.m. | 75 |
| Path 1 | Road section A | 3:00 p.m. | 130 |
| Path 1 | Road section A | 4:00 p.m. | 60 |
| Path 1 | Road section A | 5:00 p.m. | 30 |
| Path 1 | Road section A | 6:00 p.m. | 154 |
| Path 1 | Road section A | 7:00 p.m. | 170 |
| Path 1 | Road section A | 8:00 p.m. | 164 |
| Path 1 | Road section A | 9:00 p.m. | 90 |
| Path 1 | Road section A | 10:00 p.m. | 70 |
| Path 1 | Road section A | 11:00 p.m. | 40 |

Table 4 shows the corresponding traffic flow data of the road section A in the path 1 in each hour in the time period T1 (one day). In a possible implementation, the path 1 includes a road section B, and the traffic flow data of the road section B in the path 1 in each hour in the time period T1 can be marked by referring to the method shown in Table 4.

In a possible implementation, each path may include one or more road sections; and each path includes one or more road sections refers to: one or more road sections form the path together, and car will pass through these road sections when running in this path. A mapping relationship between the paths and the road sections is shown in Table 5:

TABLE 5

Mapping relationship between paths and road sections

| Path | Road section |
|---|---|
| Path 1 | Road section A |
| Path 1 | Road section B |
| Path 1 | Road section C |
| Path 1 | Road section D |
| Path 1 | Road section E |
| Path 1 | Road section F |
| Path 2 | Road section A |
| ... | ... |

As shown in Table 5, the road sections to be passed in the whole path 1 include: totally 6 road sections, namely, the road section A, the road section B, the road section C, the road section D, the road section E and the road section F. Similarly, the road sections to be passed in the whole path 1 include the road section A . . . . The number of the road sections included in each path can be the same or different, for example, the path 1 includes 5 road sections, and the path 2 includes 3 road sections; and in addition, the road sections included in each path may be intersected, for example, the path 1 and the path 2 both include the road sections A.

Then, the corresponding traffic flow data of each road section in the same unit time can be determined as a traffic flow sequence corresponding to the unit time based on the corresponding traffic flow data of each road section in each unit time (per hour) in the time period T1 (24 h), as shown in Table 6:

TABLE 6

Mapping relationship between paths and traffic flow data of each road section

| Path | Time | Road section A | Road section B | Road section C | Road section D | Road section E | Road section F | Traffic flow data sequence of A-B-C-D-E-F road sections |
|---|---|---|---|---|---|---|---|---|
| Path 1 | 0:00 a.m. | 20 | 201 | 190 | 262 | 205 | 450 | 20-201-190-262-205-450 |
| Path 1 | 1:00 a.m. | 15 | 243 | 241 | 313 | 84 | 474 | 15-243-241-313-84-474 |
| Path 1 | 2:00 a.m. | 26 | 108 | 446 | 204 | 112 | 439 | 26-108-446-204-112-439 |
| Path 1 | 3:00 a.m. | 9 | 436 | 93 | 435 | 400 | 359 | 9-436-93-435-400-359 |
| Path 1 | 4:00 a.m. | 5 | 259 | 216 | 191 | 81 | 5 | 5-259-216-191-81-5 |
| Path 1 | 5:00 a.m. | 10 | 347 | 271 | 288 | 244 | 365 | 10-347-271-288-244-365 |
| Path 1 | 6:00 a.m. | 50 | 86 | 473 | 235 | 105 | 444 | 50-86-473-235-105-444 |
| Path 1 | 7:00 a.m. | 76 | 310 | 314 | 161 | 140 | 266 | 76-310-314-161-140-266 |
| Path 1 | 8:00 a.m. | 90 | 79 | 153 | 402 | 361 | 410 | 90-79-153-402-361-410 |
| Path 1 | 9:00 a.m. | 120 | 308 | 330 | 224 | 440 | 207 | 120-308-330-224-440-207 |
| Path 1 | 10:00 a.m. | 100 | 482 | 335 | 46 | 216 | 409 | 100-482-335-46-216-409 |
| Path 1 | 11:00 a.m. | 70 | 219 | 490 | 313 | 275 | 444 | 70-219-490-313-275-444 |
| Path 1 | 12:00 p.m. | 90 | 177 | 58 | 227 | 63 | 482 | 90-177-58-227-63-482 |
| Path 1 | 1:00 p.m. | 80 | 158 | 326 | 222 | 381 | 358 | 80-158-326-222-381-358 |
| Path 1 | 2:00 p.m. | 75 | 377 | 478 | 177 | 267 | 18 | 75-377-478-177-267-18 |

TABLE 6-continued

Mapping relationship between paths and traffic flow data of each road section

| Path | Time | Road section A | Road section B | Road section C | Road section D | Road section E | Road section F | Traffic flow data sequence of A-B-C-D-E-F road sections |
|---|---|---|---|---|---|---|---|---|
| Path 1 | 3:00 p.m. | 130 | 346 | 303 | 125 | 38 | 213 | 130-346-303-125-38-213 |
| Path 1 | 4:00 p.m. | 60 | 38 | 336 | 56 | 26 | 181 | 60-38-336-56-26-181 |
| Path 1 | 5:00 p.m. | 30 | 49 | 334 | 423 | 164 | 278 | 30-49-334-423-164-278 |
| Path 1 | 6:00 p.m. | 154 | 84 | 280 | 350 | 306 | 345 | 154-84-280-350-306-345 |
| Path 1 | 7:00 p.m. | 170 | 308 | 183 | 497 | 165 | 265 | 170-308-183-497-165-265 |
| Path 1 | 8:00 p.m. | 164 | 203 | 137 | 357 | 328 | 278 | 164-203-137-357-328-278 |
| Path 1 | 9:00 p.m. | 90 | 422 | 117 | 456 | 241 | 434 | 90-422-117-456-241-434 |
| Path 1 | 10:00 p.m. | 70 | 150 | 438 | 385 | 227 | 176 | 70-150-438-385-227-176 |
| Path 1 | 11:00 p.m. | 40 | 426 | 263 | 126 | 216 | 201 | 40-426-263-126-216-201 |

As shown in Table 6, the corresponding traffic flow sequence of the path 1 in each unit time can be obtained. One traffic flow sequence corresponds to one unit time; for example, if the unit time is 0:00 a.m., the corresponding traffic flow sequence will be 20-201-190-262-205-450, and each numerical value in the traffic flow sequence represents the traffic flow data of each road section at 0:00 a.m., for example, the numerical value 201 in the traffic flow sequence represents that the traffic flow data of the road section B at 0:00 a.m. is 2.01 million, and the traffic flow data may include the number of all vehicles passing through the road section; if the unit time is 1:00 a.m., the corresponding traffic flow sequence will be 15-243-241-313-84-474, each numerical value in the traffic flow sequence represents traffic flow data of each road section at 1:00 a.m., for example, the numerical value 243 in the traffic flow sequence represents that the traffic flow data of the road section B at 1:00 a.m. is 2.43 million, and so on. The corresponding traffic flow sequences at all of the 24 unit times are recorded in Table 3.

S320: Determine a free parking space change trend of the N stop areas in the time period T1 according to the free parking space information, and mine the free parking space change trend of the N stop areas in the time period T1 to obtain parking space prediction information.

In this application, a time difference between any two adjacent unit times in the K unit times is called a time interval, and the K unit times correspond to K time intervals. Any one of the K unit times is represented as an $i^{th}$ unit time, the time difference between an $(i+1)^{th}$ unit time and the $i^{th}$ unit time represents an $i^{th}$ time interval in the K time intervals, i is a positive integer and i≤K (1≤i≤24). For example, the time difference between 0:00 a.m. and 1:00 a.m. is called the $1^{st}$ time interval, the time difference between 1:00 a.m. and 2:00 a.m. is called the $2^{nd}$ time interval, and so on, the time difference between 11:00 p.m. and 0:00 a.m. is called the $24^{th}$ time interval, and 24 hours correspond to 24 time intervals. 1:00 a.m. represents the $1^{st}$ unit time; if i=11:00 p.m., i+1=0, and 0:00 a.m. represents the $24^{th}$ unit time, that is, the $(i+1)^{th}$ unit time represents the $24^{th}$ unit time.

In a possible implementation, the free parking space change trend of the N stop areas in the time period T1 can be represented by K free parking space change sequences. Moreover, one free parking space change sequence corresponds to one time interval, and the free parking space change sequence corresponding to the $i^{th}$ time interval is represented as $C_i$. Of course, in addition to being represented by using sequences, the free parking space change trend can also be represented by an array and the like, and this embodiment of this application has no specific limitation on this.

In a possible implementation, a free parking space sequence $S_i$ corresponding to the $i^{th}$ unit time is constructed according to the free parking space data of each stop area at the $i^{th}$ unit time; and then a free parking space sequence $S_{i+1}$ corresponding to the $(i+1)^{th}$ unit time is constructed according to the free parking space data of each stop area at the $(i+1)^{th}$ unit time. As shown in Table 3, Table 3 includes 24 free parking space sequences corresponding to 24 unit times; for example, the free parking space sequence $S_0$ corresponding to 0:00 a.m. is 20-201-190-262-205-450; and the free parking space sequence $S_1$ corresponding to 1:00 a.m. is 15-243-241-313-84-474. Further, a free parking space change value between the free parking space sequence $S_i$ and the free parking space sequence $S_{i+1}$ is acquired; and finally, the free parking space change sequence $C_i$ corresponding to the $i^{th}$ time interval is constructed according to the free parking space change value. For example, the difference value between the free parking space sequence $S_1$ corresponding to 1:00 a.m. and the free parking space sequence $S_0$ corresponding to 0:00 a.m. is treated as the free parking space change sequence in the time interval of 0:00 a.m.-1:00 a.m.: −5, 42, 51, 51, −121, 24.

Then, the process of determining the free parking space change trend of the N stop areas in the time period T1 is illustrated as follows:

firstly, a time interval is set; as described above, one time interval can be represented as the time difference between two adjacent unit times; for example, one minute is set as one time interval, or one hour is set as one time interval. Then, it is needed to compute the difference value between the free parking space of a certain stop area in a next unit time (for example, a next hour) and the free parking space of a previous unit time (for example, a previous hour), thereby obtaining the change value in the time interval.

For example, the number change of the free parking spaces of each stop area at each time interval is obtained as follows based on the acquired free parking space data of each stop area in the path 1 at different unit times in the time period. The number change of the free parking spaces of each stop area at the time interval is obtained based on a mapping relationship table (Table 3) of the 24-hour path and the free parking space number of each stop area in the above steps, as shown in Table 7 below.

TABLE 7

Mapping relationship I between each time interval and free parking space change trend of each stop area

| Time interval | Free parking space change value of stop area A | Free parking space change value of stop area B | Free parking space change value of stop area C | Free parking space change value of stop area D | Free parking space change value of stop area E | Free parking space change value of stop area F |
|---|---|---|---|---|---|---|
| 0:00 a.m.-1:00 a.m. | −5 | 42 | 51 | 51 | −121 | 24 |
| 1:00 a.m.-2:00 a.m. | 11 | −135 | 205 | −109 | 28 | −35 |
| 2:00 a.m.-3:00 a.m. | −17 | 328 | −353 | 231 | 288 | −80 |
| 3:00 a.m.-4:00 a.m. | −4 | −177 | 123 | −244 | −319 | −354 |
| 4:00 a.m.-5:00 a.m. | 5 | 88 | 55 | 97 | 163 | 360 |
| 5:00 a.m.-6:00 a.m. | 40 | −261 | 202 | −53 | −139 | 79 |
| 6:00 a.m.-7:00 a.m. | 26 | 224 | −159 | −74 | 35 | −178 |
| 7:00 a.m.-8:00 a.m. | 14 | −231 | −161 | 241 | 221 | 144 |
| 8:00 a.m.-9:00 a.m. | 30 | 229 | 177 | −178 | 79 | −203 |
| 9:00 a.m.-10:00 a.m. | −20 | 174 | 5 | −178 | −224 | 202 |
| 10:00 a.m.-11:00 a.m. | −30 | −263 | 155 | 267 | 59 | 35 |
| 11:00 a.m.-12:00 p.m. | 20 | −42 | −432 | −86 | −212 | 38 |
| 12:00 p.m.-1:00 p.m. | −10 | −19 | 268 | −5 | 318 | −124 |
| 1:00 p.m.-2:00 p.m. | −5 | 219 | 152 | −45 | −114 | −340 |
| 2:00 p.m.-3:00 p.m. | 55 | −31 | −175 | −52 | −229 | 195 |
| 3:00 p.m.-4:00 p.m. | −70 | −308 | 33 | −69 | −12 | −32 |
| 4:00 p.m.-5:00 p.m. | −30 | 11 | −2 | 367 | 138 | 97 |
| 5:00 p.m.-6:00 p.m. | 124 | 35 | −54 | −73 | 142 | 67 |
| 6:00 p.m.-7:00 p.m. | 16 | 224 | −97 | 147 | −141 | −80 |
| 7:00 p.m.-8:00 p.m. | −6 | −105 | −46 | −140 | 163 | 13 |
| 8:00 p.m.-9:00 p.m. | −74 | 219 | −20 | 99 | −87 | 156 |
| 9:00 p.m.-10:00 p.m. | −20 | −272 | 321 | −71 | −14 | −258 |
| 10:00 p.m.-11:00 p.m. | −30 | 276 | −175 | −259 | −11 | 25 |
| 11:00 p.m.-0:00 a.m. | −20 | −225 | −73 | 136 | −11 | 249 |

In a possible implementation, a symbol mark may be adopted to represent the change trend; for example, if the change value of the free parking spaces at a certain time interval is positive, the change trend can be marked as symbol 1, and if the change value of the free parking spaces at a certain time interval is negative, the change trend can be marked as a symbol −1; and if the change value of the free parking spaces at a certain time interval is 0, the change trend can be marked as a symbol 0. Based on that, after the symbol marks are adopted for conversion processing on the basis of Table 7, the number change of the free parking spaces of each stop area at each time interval is shown in Table 8 below:

TABLE 8

Mapping relationship II between each time interval and free parking space change trend of each stop area

| Time interval | Increase/decrease of free parking spaces of stop area A | Increase/decrease of free parking spaces of stop area B | Increase/decrease of free parking spaces of stop area C | Increase/decrease of free parking spaces of stop area D | Increase/decrease of free parking spaces of stop area E | Increase/decrease of free parking spaces of stop area F |
| --- | --- | --- | --- | --- | --- | --- |
| 0:00 a.m.-1:00 a.m. | −1 | 1 | 1 | 1 | −1 | 1 |
| 1:00 a.m.-2:00 a.m. | 1 | −1 | 1 | −1 | 1 | −1 |
| 2:00 a.m.-3:00 a.m. | −1 | 1 | −1 | 1 | 1 | −1 |
| 3:00 a.m.-4:00 a.m. | −1 | −1 | 1 | −1 | −1 | −1 |
| 4:00 a.m.-5:00 a.m. | 1 | 1 | 1 | 1 | 1 | 1 |
| 5:00 a.m.-6:00 a.m. | 1 | −1 | 1 | −1 | −1 | 1 |
| 6:00 a.m.-7:00 a.m. | 1 | 1 | −1 | −1 | 1 | −1 |
| 7:00 a.m.-8:00 a.m. | 1 | −1 | −1 | 1 | 1 | 1 |
| 8:00 a.m.-9:00 a.m. | 1 | 1 | 1 | −1 | 1 | −1 |
| 9:00 a.m.-10:00 a.m. | −1 | 1 | 1 | −1 | −1 | 1 |
| 10:00 a.m.-11:00 a.m. | −1 | −1 | 1 | 1 | 1 | 1 |
| 11:00 a.m.-12:00 p.m. | 1 | −1 | −1 | −1 | −1 | 1 |
| 12:00 p.m.-1:00 p.m. | −1 | −1 | 1 | −1 | 1 | −1 |
| 1:00 p.m.-2:00 p.m. | −1 | 1 | 1 | −1 | −1 | −1 |
| 2:00 p.m.-3:00 p.m. | 1 | −1 | −1 | −1 | −1 | 1 |
| 3:00 p.m.-4:00 p.m. | −1 | −1 | 1 | −1 | −1 | −1 |
| 4:00 p.m.-5:00 p.m. | −1 | 1 | −1 | 1 | 1 | 1 |
| 5:00 p.m.-6:00 p.m. | 1 | 1 | −1 | −1 | 1 | 1 |
| 6:00 p.m.-7:00 p.m. | 1 | 1 | −1 | 1 | −1 | −1 |
| 7:00 p.m.-8:00 p.m. | −1 | −1 | −1 | −1 | 1 | 1 |
| 8:00 p.m.-9:00 p.m. | −1 | 1 | −1 | 1 | −1 | 1 |
| 9:00 p.m.-10:00 p.m. | −1 | −1 | 1 | −1 | −1 | −1 |
| 10:00 p.m.-11:00 p.m. | −1 | 1 | −1 | −1 | −1 | 1 |
| 11:00 p.m.-0:00 a.m. | −1 | −1 | −1 | 1 | −1 | 1 |

Further, based on Table 8, the increase/decrease change trend of the free parking spaces, divided by time intervals, of each stop area in the path is shown in Table 9 below:

TABLE 9

Increase/decrease trend of free parking spaces of each stop area at each time interval

| Time interval | Increase/decrease of free parking spaces of stop area A | Increase/decrease of free parking spaces of stop area B | Increase/decrease of free parking spaces of stop area C | Increase/decrease of free parking spaces of stop area D | Increase/decrease of free parking spaces of stop area E | Increase/decrease of free parking spaces of stop area F |
|---|---|---|---|---|---|---|
| 0:00 a.m.-1:00 a.m. | Decrease | Increase | Increase | Increase | Decrease | Increase |
| 1:00 a.m.-2:00 a.m. | Increase | Decrease | Increase | Decrease | Increase | Decrease |
| 2:00 a.m.-3:00 a.m. | Decrease | Increase | Decrease | Increase | Increase | Decrease |
| 3:00 a.m.-4:00 a.m. | Decrease | Decrease | Increase | Decrease | Decrease | Decrease |
| 4:00 a.m.-5:00 a.m. | Increase | Increase | Increase | Increase | Increase | Increase |
| 5:00 a.m.-6:00 a.m. | Increase | Decrease | Increase | Decrease | Decrease | Increase |
| 6:00 a.m.-7:00 a.m. | Increase | Increase | Decrease | Decrease | Increase | Decrease |
| 7:00 a.m.-8:00 a.m. | Increase | Decrease | Decrease | Increase | Increase | Increase |
| 8:00 a.m.-9:00 a.m. | Increase | Increase | Increase | Decrease | Increase | Decrease |
| 9:00 a.m.-10:00 a.m. | Decrease | Increase | Increase | Decrease | Decrease | Increase |
| 10:00 a.m.-11:00 a.m. | Decrease | Decrease | Increase | Increase | Increase | Increase |
| 11:00 a.m.-12:00 p.m. | Increase | Decrease | Decrease | Decrease | Decrease | Increase |
| 12:00 p.m.-1:00 p.m. | Decrease | Decrease | Increase | Decrease | Increase | Decrease |
| 1:00 p.m.-2:00 p.m. | Decrease | Increase | Increase | Decrease | Decrease | Decrease |
| 2:00 p.m.-3:00 p.m. | Increase | Decrease | Decrease | Decrease | Decrease | Increase |
| 3:00 p.m.-4:00 p.m. | Decrease | Decrease | Increase | Decrease | Decrease | Decrease |
| 4:00 p.m.-5:00 p.m. | Decrease | Increase | Decrease | Increase | Increase | Increase |
| 5:00 p.m.-6:00 p.m. | Increase | Increase | Decrease | Decrease | Increase | Increase |
| 6:00 p.m.-7:00 p.m. | Increase | Increase | Decrease | Increase | Decrease | Decrease |
| 7:00 p.m.-8:00 p.m. | Decrease | Decrease | Decrease | Decrease | Increase | Increase |
| 8:00 p.m.-9:00 p.m. | Decrease | Increase | Decrease | Increase | Decrease | Increase |
| 9:00 p.m.-10:00 p.m. | Decrease | Decrease | Increase | Decrease | Decrease | Decrease |
| 10:00 p.m.-11:00 p.m. | Decrease | Increase | Decrease | Decrease | Decrease | Increase |
| 11:00 p.m.-0:00 a.m. | Decrease | Decrease | Decrease | Increase | Decrease | Increase |

Of course, the change value with "positive" mark can be marked as "decrease", and the change value with "negative" mark is marked as "increase" directly according to the change value of the number of free parking spaces of each stop area at the time interval shown in Table 7, and then the increase/decrease change trend of the free parking spaces, divided by the time interval, of each stop area in the path shown in Table 9 is obtained.

Further, based on the change trend of each stop area of the path in the time interval, the free parking space change sequence of each stop area is constructed; and for example, for each stop area in the path 1, the free parking space change sequence constructed according to Table 9 is shown in Table 10 below:

TABLE 10

Free parking space change sequence of each stop area in path 1 at each time interval

| Path | Time interval | Free parking space change sequence of A-B-C-D-E-F stop areas |
|---|---|---|
| Path 1 | 0:00 a.m.-1:00 a.m. | Decrease-increase-increase-increase-decrease-increase |
| Path 1 | 1:00 a.m.-2:00 a.m. | Increase-decrease-increase-decrease-increase-decrease |
| Path 1 | 2:00 a.m.-3:00 a.m. | Decrease-increase-decrease-increase-increase-decreasee |

TABLE 10-continued

Free parking space change sequence of each stop area in path 1 at each time interval

| Path | Time interval | Free parking space change sequence of A-B-C-D-E-F stop areas |
|---|---|---|
| Path 1 | 3:00 a.m.-4:00 a.m. | Decrease-decrease-increase-decrease-decrease-decrease |
| Path 1 | 4:00 a.m.-5:00 a.m. | Increase-increase-increase-increase-increase-increase |
| Path 1 | 5:00 a.m.-6:00 a.m. | Increase-decrease-increase-decrease-decrease-increase |
| Path 1 | 6:00 a.m.-7:00 a.m. | Increase-increase-decrease-decrease-increase-decrease |
| Path 1 | 7:00 a.m.-8:00 a.m. | Increase-decrease-decrease-increase-increase-increase |
| Path 1 | 8:00 a.m.-9:00 a.m. | Increase-increase-increase-decrease-increase-decrease |
| Path 1 | 9:00 a.m.-10:00 a.m. | Decrease-increase-increase-decrease-decrease-increase |
| Path 1 | 10:00 a.m.-11:00 a.m. | Decrease-decrease-increase-increase-increase |
| Path 1 | 11:00 a.m.-12:00 p.m. | Increase-decrease-decrease-decrease-decrease-increase |
| Path 1 | 12:00 p.m.-1:00 p.m. | Decrease-decrease-increase-decrease-increase-decrease |
| Path 1 | 1:00 p.m.-2:00 p.m. | Decrease-increase-increase-decrease-decrease-decrease |
| Path 1 | 2:00 p.m.-3:00 p.m. | Increase-decrease-decrease-decrease-decrease-increase |
| Path 1 | 3:00 p.m.-4:00 p.m. | Decrease-decrease-increase-decrease-decrease-decrease |
| Path 1 | 4:00 p.m.-5:00 p.m. | Decrease-increase-decrease-decrease-increase-increase |
| Path 1 | 5:00 p.m.-6:00 p.m. | Increase-increase-decrease-decrease-increase-increase |
| Path 1 | 6:00 p.m.-7:00 p.m. | Increase-increase-decrease-increase-decrease-decrease |
| Path 1 | 7:00 p.m.-8:00 p.m. | Decrease-decrease-decrease-decrease-increase-increase |
| Path 1 | 8:00 p.m.-9:00 p.m. | Decrease-increase-decrease-increase-decrease-increase |
| Path 1 | 9:00 p.m.-10:00 p.m. | Decrease-decrease-increase-decrease-decrease-decrease |
| Path 1 | 10:00 p.m.-11:00 p.m. | Decrease-increase-decrease-decrease-decrease-increase |
| Path 1 | 11:00 p.m.-0:00 a.m. | Decrease-decrease-decrease-increase-decrease-increase |

In a possible implementation, the parking space prediction information includes a free parking space change frequent sequence corresponding to each time interval in the K time intervals, and the free parking space change frequent sequence includes information of the stop area with the free parking spaces at each time interval, so that a parking space recommendation service or a parking space planning service can be provided. According to this application, a mining algorithm based on a sequence mode can be adopted; and mining and analysis based on the sequence mode are performed on the free parking space change trend of the N stop areas in the target path in the time period T1 and the free parking space change trend of the N stop areas in the target path in a time period T2 to obtain a free parking space change frequent sequence of the target path at the $i^{th}$ time interval. The mining algorithm based on the sequence mode includes but is not limited to: a prefix-projected pattern growth algorithm (prefixspan algorithm), an AprioriAll algorithm, a GSP algorithm, a FreeSpan algorithm, etc.; and this embodiment of this application has no specific limitation on the mining algorithm.

S330: Construct traffic flow feature vectors of the M road sections in the time period T1 according to the traffic flow information, and cluster the traffic flow feature vectors to obtain road section prediction information.

In a possible implementation, the computer device is configured to determine a traffic flow increase/decrease trend of the M road sections in the time period T1 according to the traffic flow information. In this application, analyzing the traffic flow increase/decrease trend of each road section based on the time interval includes the following operation steps:

firstly, a time interval is set; as described above, one time interval can be represented as the time difference between two adjacent unit times; for example, one minute is set as one time interval, or one hour is set as one time interval. Then, it is needed to compute a difference value between the traffic flow data of a certain stop area at a next unit time and the traffic flow data at a previous unit time to obtain a change value at the time interval. For example, the traffic flow change of each road section at each time interval is obtained as follows based on the acquired traffic flow data of each road section included in the path 1 at different unit times in the time period. The traffic flow change of each road section at the time interval is obtained based on the mapping relationship table (Table 6) of 24-hour path and flow of each road section in the above steps.

The process of "determining a traffic flow increase/decrease trend of the M road sections in the time period T1 according to the traffic flow information" can refer to the step of "determining a free parking space change trend of the N stop areas in the time period T1 according to the free parking space information", and no more description is made herein. Moreover, for each path (for example, a path 2 and a path 3), the processing mode can refer to the processing mode of the path 1 for detail, and no more description is made in this application.

In a possible implementation, according to this application, a plurality of road sections in the target path are clustered through a clustering method, so as to obtain the road section prediction information, and the road section prediction information can include one or more non-congested road sections in the target path; and optionally, the road section prediction information can also include one or more congested road sections in the target path.

In a possible implementation, according to this application, the plurality of road sections in the target path can be clustered through an integrated clustering method, so as to obtain the road section prediction information. The integrated clustering refers to that in order to improve the accuracy, stability and robustness of clustering results, a plurality of clustering results are integrated to obtain a better result. The basic idea of integrated clustering is that a plurality of independent clustering devices (or clustering algorithms) are used for clustering original data sets respectively, then a certain integration method is used for processing, and a final integration result is obtained. According to the idea of integrated clustering, the integration method provided in this embodiment of this application can be a voting method, namely, the voting method is adopted as a consistency function to integrate a plurality of clustering results. The integrated clustering process in this embodiment of this application includes the following steps: (1) determine clustering members: firstly, traffic flow data of each path is acquired, and a plurality of traffic flow feature component vectors corresponding to each path according to the traffic flow data of each path are determined (the number of the traffic flow feature component vectors is related to the divided time interval, and the determined plurality of traffic flow feature component vectors can be determined according to different dimensions such as the people flow density of each path and surrounding traffic facilities); and the plurality of traffic flow feature component vectors of each path are clustered by a plurality of (two or more) clustering algorithms based on the plurality of traffic flow feature component vectors of each path, so as to obtain a plurality of clustering results, and the clustering algorithms here include but are not limited to Kmeans algorithm, density-based spatial clustering of applications with noise (DB-SCAN) algorithm, Self-organizing maps (SOM), web spider protocol (COBWeb) algorithm, etc. One clustering result can be obtained from each clustering algorithm, and these clustering results are respectively used as the clustering members. Secondly, the integrated clustering process includes: voting according to the division of the clustering members to each road section in the target path, computing a voting proportion of each road section divided to each cluster, and dividing the road sections into the cluster according to a principle that most votes exceed a certain threshold. For example: the clustering members vote for the road sections according to congested or non-congested conditions and compute the voting proportion of the road sections divided into each clustering category (for example, a congested category or a non-congested category), and the road sections are clustered to the category with higher votes. The road section prediction information can be obtained by clustering the plurality of road sections in the target path through the integrated clustering method.

Integrated clustering is to integrate a plurality of different clustering devices to solve the same problem. Compared with single clustering, the integrated clustering improves the quality of the clustering result and the robustness of clustering, can detect and process isolated points and noise simultaneously, can process data sets in parallel, and can effectively improve the time efficiency especially for processing large-scale data sets.

S340: Perform traffic planning for a vehicle along the target path according to the parking space prediction information and the road section prediction information.

In this embodiment of this application, the parking space prediction information includes the free parking space change frequent sequences which are obtained based on the free parking space data of the target path and respectively correspond to each time interval in the K time intervals, and the free parking space change frequent sequence includes information of a stop area with free parking spaces in the target path at each time interval. It is to be understood that by adopting the method provided in this embodiment of this application, the free parking space change frequent sequences of other paths besides the target path can be predicted and added into the parking space prediction information, so that more accurate and reasonable parking space recommendation service or parking space planning service can be provided. The road section prediction information includes one or more non-congested road sections predicted based on the traffic flow data of the target path, and it is to be understood that one or more non-congested road sections in other paths besides the target path can be predicted and added into the road section prediction information by adopting the method provided in this embodiment of this application, so that more accurate and reasonable traffic planning can be conveniently made.

In a possible implementation, parking planning can be performed according to the parking space prediction information including one or more paths; or path planning can be performed according to the road section prediction information including one or more paths; or traffic travel planning can be performed according to the parking space prediction information including one or more paths and the road section prediction information including one or more paths.

For example, this application can be applied to the fields of urban road traffic development, urban resource allocation, etc. In a possible implementation, parking planning may include: determining a stop area to be recommended from a free parking space change frequent sequence in the parking space prediction information according to travel time and a navigation path, and recommending the stop area. Path planning may include: selecting one or more non-congested road sections from the road section prediction information to combine into a navigation path according to a navigation starting point and a navigation end point, and recommending the combined navigation path. Traffic travel planning may include: selecting one or more non-congested road sections from the road section prediction information to combine into a navigation path according to the navigation starting point and the navigation end point; determining the stop area to be recommended from the free parking space change frequent sequence in the parking space prediction information according to the travel time and the combined navigation path; and recommending the combined navigation path and the stop area to be recommended. The application scene of traffic planning can refer to the description of the related application scenes such as FIG. 2c to FIG. 2d for detail, and no more description is made in this application. Of course, related application of the method provided in this application in intelligent parking and traffic path planning navigation belongs to the potential application scenes of this application.

According to this embodiment of this application, sequence mode-based mining and integrated clustering processing are fused in the traffic planning process; because the free parking space information and the traffic flow information objectively reflect the real condition of a traffic scene, the parking space prediction information is obtained by deeply mining and analyzing the free parking space information based on a sequence mode, and the road section prediction information is obtained by performing analysis and integrated clustering processing on the traffic flow information, so that the parking space prediction information and the road section prediction information are obtained after fully mining the real condition of the traffic scene, and the accuracy of the parking space prediction information and the road section prediction information are improved. Therefore, traffic planning, such as parking planning, path planning and traffic travel planning, performed based on the parking space prediction information and the road section prediction information can well adapt to the requirements of the traffic scene, and as a result, the traffic planning made in this way is more accurate and more instructive.

In a possible implementation, both the process of obtaining the parking space prediction information of the target path according to the free parking space information and the process of obtaining the road section prediction information according to the traffic flow information can be independently executed.

Figure 4:
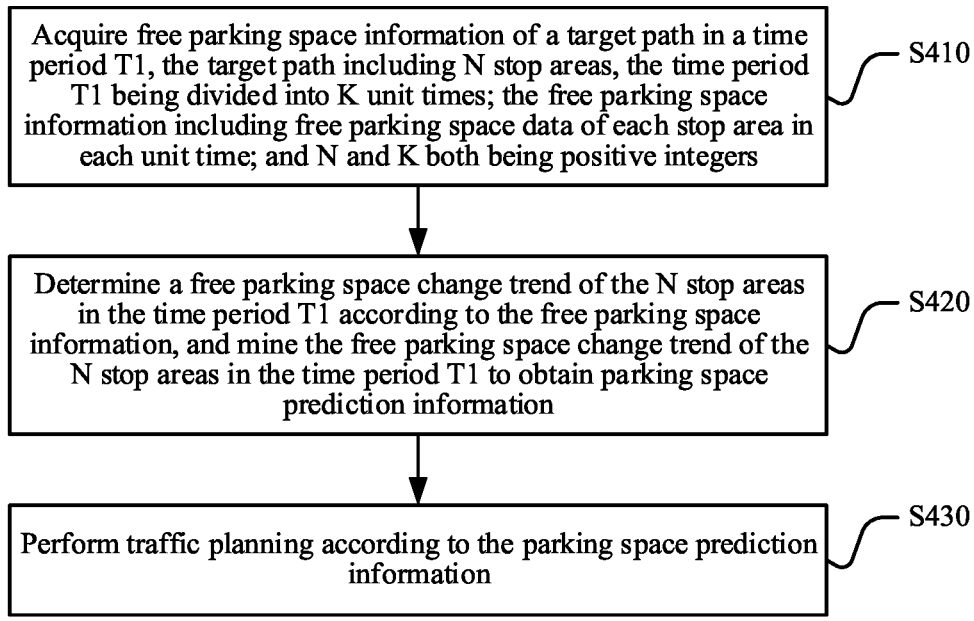
FIG. 4 is a schematic flowchart of another information processing method according to an embodiment of this application.

Referring to FIG. 4, FIG. 4 is a schematic flowchart of an information processing method according to an embodiment of this application. The information processing method can be applied to a computer device. The computer device can be a vehicle-mounted device, an intelligent phone, a tablet computer, an intelligent wearable device and other intelligent devices; the computer device can also be implemented by cooperation of the computer device and a server; and the computer device can also be the server. As shown in FIG. 4, the information processing method can include steps S410 to S430. In which:

S410: Acquire free parking space information of a target path in a time period T1, the target path including N stop areas, the time period T1 being divided into K unit times; the free parking space information including free parking space data of each stop area in each unit time; and N and K both being positive integers;

S420: Determine a free parking space change trend of the N stop areas in the time period T1 according to the free parking space information, and mine the free parking space change trend of the N stop areas in the time period T1 to obtain parking space prediction information; and S430: Perform traffic planning for a vehicle along the target path according to the parking space prediction information.

In this embodiment of this application, the free parking space information objectively reflects the real condition of a traffic scene, and the parking space prediction information is obtained by deeply mining the free parking space information, so that the parking space prediction information is obtained after fully mining the real condition of the traffic scene, as a result, the accuracy of the parking space prediction information is improved, and the traffic planning performed based on the parking space prediction information can well adapt to the requirements of the traffic scene, and the traffic planning made in this way is more accurate and more instructive.

Figure 5:
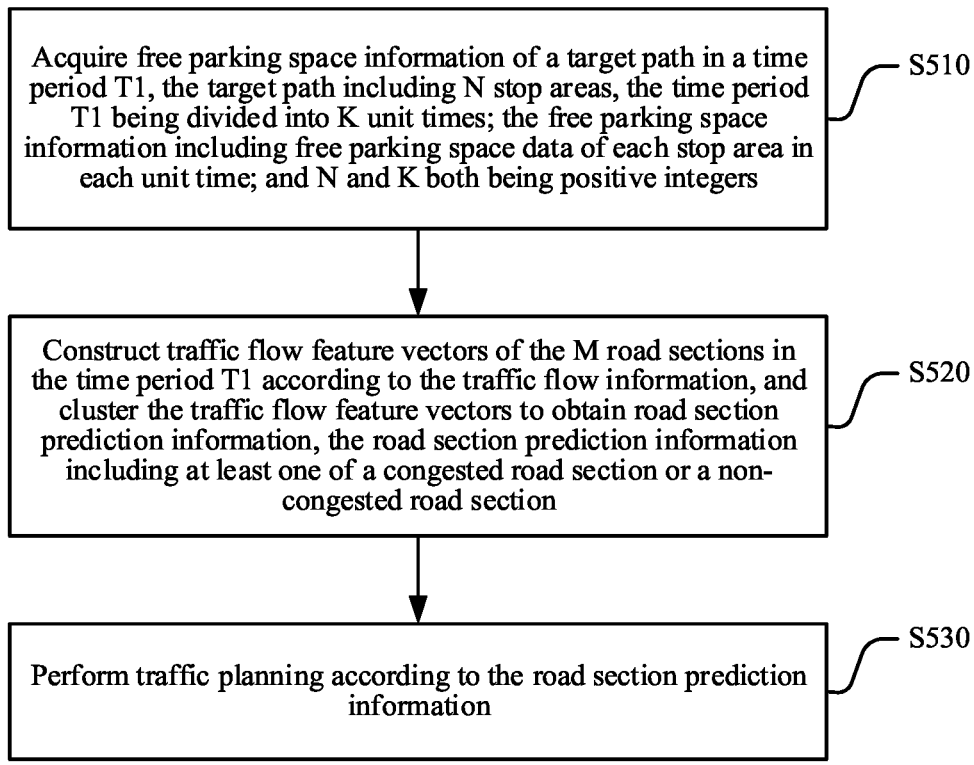
FIG. 5 is a schematic flowchart of another information processing method according to an embodiment of this application.

Referring to FIG. 5, FIG. 5 is a schematic flowchart of an information processing method according to an embodiment of this application. The information processing method can be applied to a computer device. The computer device can be a vehicle-mounted device, an intelligent phone, a tablet computer, an intelligent wearable device and other intelligent devices; the computer device can also be implemented by cooperation of the computer device and a server; and the computer device can also be the server. As shown in FIG. 5, the information processing method can include steps S510 to S530. In which:

S510: Acquire traffic flow information of a target path in a time period T1, the target path including M road sections, the time period T1 being divided into K unit times; the traffic flow information including traffic flow data of each road section in each unit time; M and K both being positive integers;

S520: Construct traffic flow feature vectors of the M road sections in the time period T1 according to the traffic flow information, and cluster the traffic flow feature vectors to obtain road section prediction information, the road section prediction information including at least one of a congested road section or a non-congested road section; and S530: Perform traffic planning according to the road section prediction information.

In this embodiment of this application, the traffic flow information objectively reflects the real condition of the traffic scene, and the road section prediction information is obtained by analyzing and clustering the traffic flow information, so that the road section prediction information is obtained after fully mining the real condition of the traffic scene, as a result, the accuracy of the road section prediction information is improved, and the traffic planning performed based on the road section prediction information can well adapt to the requirements of the traffic scene, and the traffic planning made in this way is more accurate and more instructive.

Figure 6:
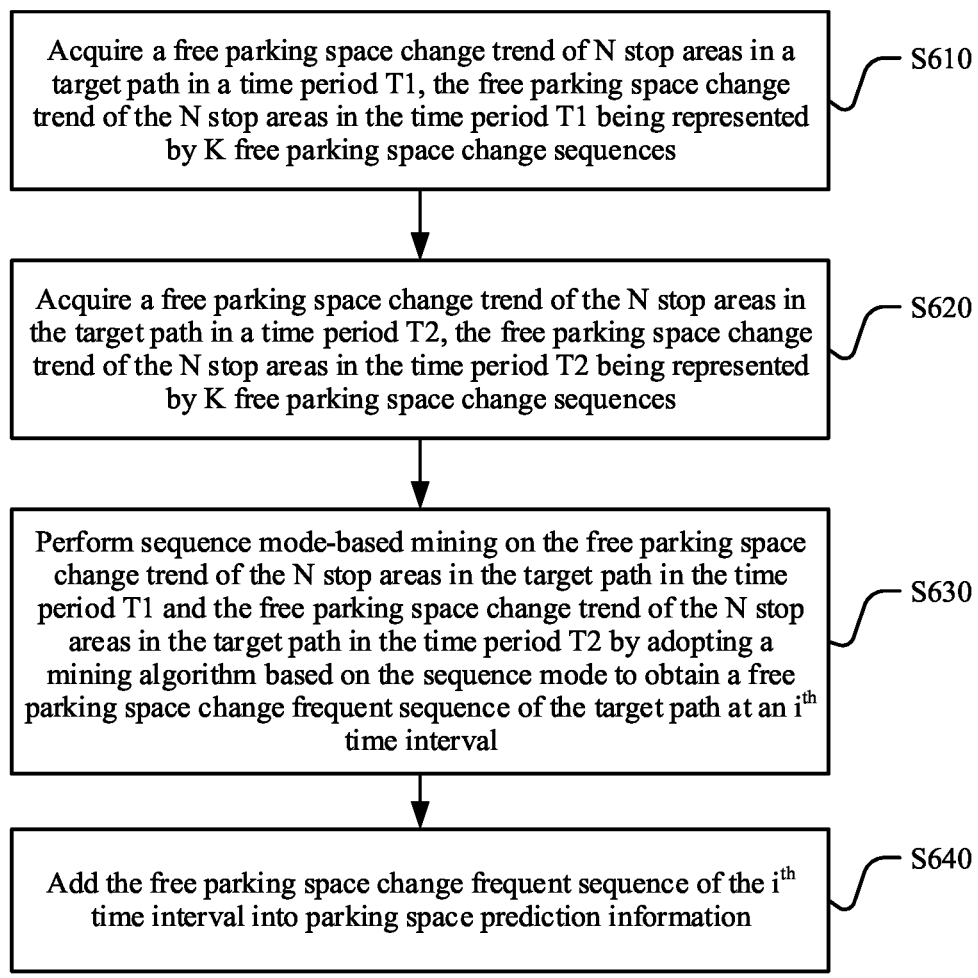
FIG. 6 is a schematic flowchart of a method for determining parking space prediction information according to an embodiment of this application.

Then, the process of mining the free parking space change trend of the N stop areas in the time period T1 to obtain parking space prediction information is introduced:

referring to FIG. 6, FIG. 6 is a schematic flowchart of a method for determining parking space prediction information according to an embodiment of this application. The method can include steps S610 to S640. In which:

S610: Acquire a free parking space change trend of the N stop areas in the target path in the time period T1, the free parking space change trend of the N stop areas in the time period T1 being represented by K free parking space change sequences.

S620: Acquire a free parking space change trend of the N stop areas in the target path in a time period T2, the free parking space change trend of the N stop areas in the time period T2 being represented by K free parking space change sequences.

The processes executed in step S620 and step S610 are consistent, and can refer to the process of "determine a free parking space change trend of the N stop areas in the time period T1" in step S320, and no more description is made in this application.

The time period T1 and the time period T2 are different; for example, the time period is one day, the T1 can be Dec. 1, 2019, and the T2 can be Dec. 2, 2019.

S630: Perform sequence mode-based mining on the free parking space change trend of the N stop areas in the target path in the time period T1 and the free parking space change trend of the N stop areas in the target path in the time period T2 by adopting a mining algorithm based on the sequence mode to obtain a free parking space change frequent sequence of the target path at an $i^{th}$ time interval.

In a possible implementation, the free parking space change trend of the N stop areas in the target path in the time period T2 is acquired, the time period T2 includes a $j^{th}$ time interval, and j is a positive integer; the $j^{th}$ time interval and the $i^{th}$ time interval in the time period T1 respectively indicate the same time interval in different time periods; the free parking space change trend of the N stop areas in the time period T2 is represented by K free parking space change sequences, and the free parking space change sequence corresponding to the $j^{th}$ time interval is represented as $C'_j$.

Then, prefixspan algorithm serving as the mining algorithm based on the sequence mode is taken as an example in this application, the process of performing sequence mode-based mining and analysis on the free parking space change trend of the N stop areas in the target path in the time period T1 to obtain a free parking space change frequent sequence of the target path at the $i^{th}$ time interval is introduced as follows:

the prefixspan algorithm refers to a divide-and-conquer idea; firstly, a sequence database is scanned to find out all sequence modes with the length of 1; these sequence modes are taken as prefixes, and the sequence database is divided into a plurality of small projection databases; then recursive sequence mode-based mining is performed on each projection database; firstly a sequence data set S is obtained, and this sequence data set is composed of free parking space change sequences of all stop areas shown in Table 10. A plurality of projection databases are generated according to prefix division, and then recursive mining is performed in the plurality of projection databases respectively until all frequent sequence modes are found.

In this application, frequent sequence of each length meeting a support degree requirement in the free parking space change sequence of each stop area at each unit time in the time period T1 are mined based on the Prefixspan algorithm. Meanwhile, a multi-minimum support degree strategy is adopted, and a computation method of the minimum support degree is shown as the following formula:

$$\text{min\_sup} = a \times n \quad (1)$$

In the formula, min_sup represents the minimum support degree, the minimum support degree is used for reflecting the occurrence frequency; for example, when the minimum support degree is 0.5, the occurrence frequency is 2; n is the time range (for example, the number of time periods) of data acquisition, for example, only data in the acquisition time period T1 is recorded in this application, and thus n=1; and a is the minimum support rate. One time period corresponds to one sample set, and the minimum support rate can be adjusted according to the number of the sample sets.

Further, the operation steps of mining sequence data by the Prefixspan algorithm include:

1, a plurality of prefixes with the length L=1 (L is a positive integer) and projection data sets corresponding to each prefix are found out from a sequence data set S, each projection data set includes one or more single items, and each single item serves as a suffix of the prefix;

2, the minimum support degree of each prefix is counted according to the formula (1), the free parking space change sequence where the prefix with the minimum support degree not meeting the support degree requirement is located is deleted from the sequence data set S, and the prefix with the minimum support degree meeting the support degree requirement is added as a frequent one-item sequence to a frequent one-item set. The meeting the support degree requirement refers to that the minimum support degree is greater than or equal to a support degree threshold, and the support degree threshold can be set according to actual requirement; and 3, the following recursive mining is executed on each prefix with the length of L and meeting the support degree requirement:

1) one prefix is selected from a frequent L item set, when L=1, the frequent L item set is the frequent one-item set, and the selected prefix is a one-item prefix; a projection data set of the selected prefix is mined, when the projection data set of the selected prefix is an empty set, recursion is performed again (namely a prefix is reselected for execution); when the projection data set of the selected prefix is a non-empty set, step 2) is continuously executed;

2) the minimum support degree of each single item in the projection data set of the selected prefix is counted, each single item with the minimum support degree meeting the support degree requirement is combined with the selected prefix to obtain a combined new prefix, the combined new prefix is added as a frequent L+1-item sequence into a frequent L+1-item set, and step 3) is continuously executed; when the minimum support degree of each single item in the projection data set of the selected prefix does not meet the support degree requirement, step 1) is performed again for recursion (namely a prefix is reselected for execution); and 3) set L=L+1, step 3) is executed in a recursive manner; and recursion is performed until a longer prefix cannot be mined, and the prefix with the longest length obtained by recursion is the mined frequent sequence.

Through the above steps, the free parking space change frequent sequence of the target path at each time interval can be obtained.

For example, based on the above principle description of the Prefixspan algorithm, the mining mode of the time and the free parking space change sequence of the stop area is illustrated as follows.

Firstly, the free parking space change sequence of the same path (for example, the path 1) at the same time interval in different time periods is constructed based on step 1. The free parking space change sequence of the path includes a changed stop area mark and a change trend; and when the increase of the free parking spaces in a stop area A is represented as "A increases", the results are shown in Table 11 below:

TABLE 11

Free parking space change sequence at the same time interval in different time periods

| Path | Period (day) | Time interval | Free parking space change sequence of stop area |
|---|---|---|---|
| Path 1 | 20191201 | 8:00 a.m.-9:00 a.m. | A increases-B increases-C increases-D decreases-E increases-F decreases |
| Path 1 | 20191202 | 8:00 a.m.-9:00 a.m. | A decreases-B increases-C increases-D decreases-E decreases-F decreases |

Then, frequent sequences in the free parking space change sequence of each stop area in the path at the same time interval in different time periods are mined based on the Prefixspan algorithm; and assuming that a support degree threshold is 0.5, the occurrence frequency of all elements with the length L=1 in the free parking space change sequence of the stop area is counted at first. Specifically, based on the two sequences in Table 11: "A increases-B increases-C increases-D decreases-E increases-F decreases" and "A decreases-B increases-C increases-D decreases-F decreases", in Table 12, all free parking space change sequence elements with the length of 1 and the occurrence frequency included in the two sequences can be represented as shown in Table 12 below:

TABLE 12

Free parking space change sequence elements and occurrence frequency

| Free parking space change sequence element | A increases | A decreases | B increases | C increases | D decreases | E increases | E decreases | F decreases |
|---|---|---|---|---|---|---|---|---|
| Occurrence frequency | 1 | 1 | 2 | 2 | 2 | 1 | 1 | 2 |

The sequence element with the minimum support degree greater than or equal to the support degree threshold in Table 12 is determined as a one-item prefix and added into the frequent one-item set, namely the sequence element with the occurrence frequency greater than or equal to 2 is determined as the one-item prefix, and the one-item prefix can include: B increases, C increases, D decreases and F decreases. Then the suffix corresponding to each one-item prefix is respectively counted, as shown in Table 13 below:

TABLE 13

One-item prefix and corresponding suffix

| One-item prefix | Corresponding suffix |
| --- | --- |
| B increases | C increases-D decreases-E increases-F decreases; C increases-D decreases-E decreases-F decreases |
| C increases | D decreases-E increases-F decreases; D decreases-E decreases-F decreases |
| D decreases | E increases-F decreases; E decreases-F decreases |
| F decreases | |

In Table 13, for the one-item prefix "B increases", firstly, all single items: "C increases", "D decreases", "E increases", "E decreases" and "F decreases" in the suffixes "C increases-D decreases-E increases-F decreases" and "C increases-D decreases-E decreases-F decreases" and the occurrence frequencies of all the single items are counted, as shown in Table 14 below:

TABLE 14

Single item and frequency

| Single item | C increases | D decreases | E increases | E decreases | F decreases |
| --- | --- | --- | --- | --- | --- |
| Frequency | 2 | 1 | 1 | 2 | 2 |

Similarly, the minimum support degree of "E increases" and "E decreases" does not meet the support degree requirement, and will be filtered out. The single items of "C increases" and "D decreases" meeting the support degree requirement are combined into a corresponding one-item prefix, so as to obtain a two-item prefix. The same mode is adopted to mine each two-item prefix (because the suffix corresponding to "F decreases" is empty, after the one-item prefix "F decreases" is obtained, mining of the prefix is stopped), and the obtained two-item prefixes meeting the support degree requirement and the corresponding suffixes are shown in Table 15.

TABLE 15

Two-item prefix and corresponding suffix

| Two-item prefix | Corresponding suffix |
| --- | --- |
| B increases-C increases | D decreases-E increases-F decreases; D decreases-E decreases-F decreases |
| C increases-D decreases | E increases-F decreases E decreases-F decreases |
| D decreases-F decreases | |

According to the above-mentioned method, mining is continued for each two-item prefix (because the corresponding suffix of "D decreases-F decreases" is empty, mining is stopped, and it is returned for recursion), and obtained three-item prefixes meeting the support degree requirement and the corresponding suffixes are shown in Table 16:

TABLE 16

Three-item prefix and corresponding suffix

| Three-item prefix | Corresponding suffix |
| --- | --- |
| B increases-C increases-D decreases | E increases-F decreases; E decreases-F decreases |
| C increases-D decreases-F decreases | |

According to the above-mentioned method, mining is continued for each three-item prefix (because the corresponding suffix of "C increases-D decreases-F decreases" is empty, mining is stopped, and it is returned for recursion), and an obtained four-item prefix meeting the support degree requirement and the corresponding suffix are shown in Table 17:

TABLE 17

Four-item prefix and corresponding suffix

| Four-item prefix | Corresponding suffix |
| --- | --- |
| B increases-C increases-D decreases-F decreases | |

Based on the above analysis, the prefix with the longest sequence length in all recursive returned prefix sequences is used as the free parking space change frequent sequence of each stop area in the path at the time interval (for example, the corresponding free parking space change frequent sequence of each stop area in the path 1 at 8:00 a.m.-9:00 a.m. is "B increases-C increases-D decreases-F decreases"). In addition, each stop area can be updated and changed in real time along with the time period, so that the latest change trend can be mined in real time, the real-time analysis of the parking space change can be better performed, the change rule can be found, the analysis of the parking space traffic flow change has the advantage of real-time performance, and the efficiency is better.

S640: Add the free parking space change frequent sequence of the $i^{th}$ time interval into the parking space prediction information, the parking space prediction information including the free parking space change frequent sequences respectively corresponding to each time interval in the K time intervals.

In this application, the step of determining the free parking space change frequent sequence of the $i^{th}$ time interval has no more description made in this application; and the free parking space change frequent sequence corresponding to any time interval can be determined by referring to the above-mentioned method. Therefore, the parking space prediction information including K free parking space change frequent sequences can be obtained, and each time interval corresponds to one free parking space change frequent sequence.

In this application, the free parking space change trend is mined through the sequence mode-based mining algorithm, so that the real-time analysis of the free parking space change can be better performed, the change rule can be found; and therefore, the real-time advantage is achieved, and then the processing efficiency is improved.

Figure 7:
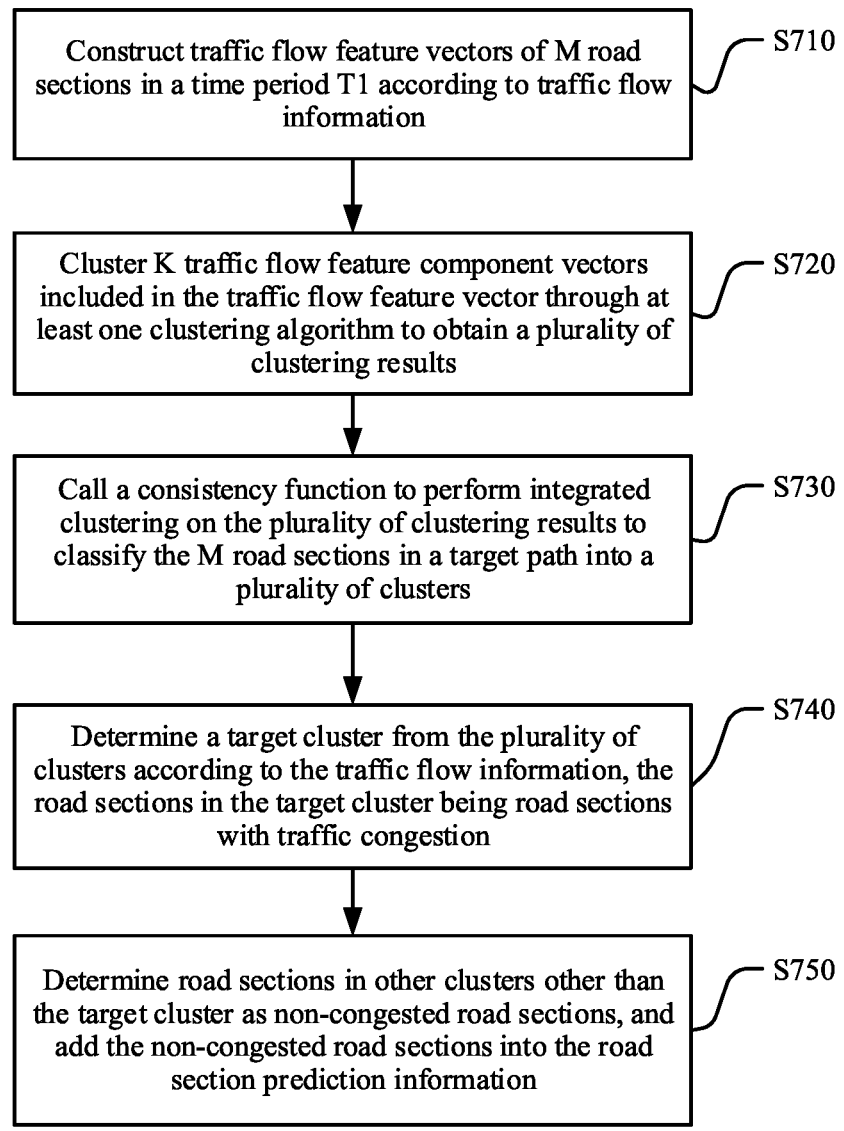
FIG. 7 is a schematic flowchart of a method for determining road section prediction information according to an embodiment of this application.

Then, the process of constructing the traffic flow feature vectors and determining the road section prediction information is introduced as follows. Referring to FIG. 7, FIG. 7 is a schematic flowchart of a method for determining road section prediction information according to an embodiment of this application. The method can include steps S710 to S750. In which:

S710: Construct traffic flow feature vectors of the M road sections in the time period T1 according to the traffic flow information.

In a possible implementation, the traffic flow feature vectors include traffic flow feature component vectors at each unit time in the K unit times. The constructing traffic flow feature vectors of the M road sections in the time period T1 according to the traffic flow information includes: firstly, a traffic flow change value between traffic flow data of each road section at the $i^{th}$ unit time and traffic flow data of each road section at an $(i-1)^{th}$ unit time is acquired; and then the traffic flow feature component vector at the $i^{th}$ unit time is constructed according to the traffic flow data of each road section at the $i^{th}$ unit time and the traffic flow change value.

For example, traffic flow congestion data feature vector (traffic flow feature component vector) results corresponding to 0:00 a.m.-1:00 a.m. are constructed based on the corresponding traffic flow sequence (Table 6), the corresponding traffic flow change sequence (Table 7) and road feature data of a certain path (for example, the path 1) at each time interval. For example, the corresponding traffic flow sequence of each road section in the path 1 at 1:00 a.m. is 15, 243, 241, 313, 84, 474; the traffic flow change sequence of each road section in the path 1 at 1:00 a.m. compared with that at 0:00 a.m. is −5, 42, 51, 51, −121, 24; and the constructed corresponding traffic flow feature component vector of the path 1 at 0:00 a.m.-1:00 a.m. can be [15, 243, 241, 313, 84, 474, −5, 42, 51, 51, −121, 24]. Similarly, the corresponding traffic flow feature component vector of the path 1 at 1:00 a.m.-2:00 a.m. can be [26, 108, 446, 204, 112, 439, 11, −135, 205, −109, 28, −35], and so on, 24 traffic flow feature component vectors included in the path 1 can be obtained.

In a possible implementation, the traffic flow feature vectors include the traffic flow feature component vectors of each unit time in the K unit times; and further, the traffic flow information further includes scene data of the target path in the time period T1, and the scene data includes the scene data of the target path at the $i^{th}$ unit time. The scene data includes but is not limited to: factors related to the people flow intensity such as whether it is rush hour, whether it is a holiday, whether there is a large business district nearby, whether there is a visiting scenic spot nearby, whether there are a subway and a bus nearby, and whether there are a school and a hospital nearby.

In some embodiments, the constructing the traffic flow feature vectors of the M road sections in the time period T1 according to the traffic flow information includes: firstly, a traffic flow change value between traffic flow data of each road section at the $i^{th}$ unit time and traffic flow data of each road section at an $(i-1)^{th}$ unit time is acquired; and then, scene data at the $i^{th}$ unit time is standardized to obtain scene features at the $i^{th}$ unit time; and finally, the traffic flow feature component vectors at the $i^{th}$ unit time are constructed according to the traffic flow data of each road section at the $i^{th}$ unit time, the traffic flow change value and the scene features at the $i^{th}$ unit time.

The standardization of the scene data can include: a 01 vector is adopted for marking, for example, in a case of the rush hour, it is marked as "1", otherwise it is marked as "0"; and similarly, in a case of the holiday, it is marked as "1", otherwise it is marked as "0", and so on.

For example, traffic flow congestion data feature vector (traffic flow feature component vector) results corresponding to 0:00 a.m.-1:00 a.m. are constructed based on the corresponding traffic flow sequence (Table 6), the corresponding traffic flow change sequence (Table 7) and road feature data of a certain path (for example, the path 1) at each time interval. For example, the corresponding traffic flow sequence of each road section in the path 1 at 1:00 a.m. is 15, 243, 241, 313, 84, 474; the traffic flow change sequence of each road section in the path 1 at 1:00 a.m. compared with that at 0:00 a.m. is −5, 42, 51, 51, −121, 24; each road section in the path 1 at 0:00 a.m.-1:00 a.m. is not in a rush hour and is in a holiday, there is no large business district near the path 1, and there is a scenic spot near the path 1. Then, the constructed corresponding traffic flow feature component vector of the path 1 at 0:00 a.m.-1:00 a.m. can be [15, 243, 241, 313, 84, 474, −5, 42, 51, 51, −121, 24, 0, 1, 0, 1]. Similarly, the corresponding traffic flow feature component vector of the path 1 at 1:00 a.m.-2:00 a.m. can be [26, 108, 446, 204, 112, 439, 11, −135, 205, −109, 28, −35, 1, 0, 0, 1], and so on, and 24 traffic flow feature component vectors included in the path 1 can be obtained. Because the feature vectors of each time interval in the period is dynamically changed, the same path has a plurality of feature vectors. Moreover, the traffic flow feature component vector corresponding to each time interval can refer to the construction process of the traffic flow feature component vector corresponding to 0:00 a.m.-1:00 a.m., and no more description is made in this application, so that a plurality of feature vectors can be finally obtained for each path (for example, the time period is 1 day, the time interval is 1 h, and the path 1 can include 24 feature vectors).

S720: Cluster K traffic flow feature component vectors included in the traffic flow feature vector through at least one clustering algorithm to obtain a plurality of clustering results.

In this application, the clustering algorithms include but are not limited to: a distance-based clustering algorithm or a density-based clustering algorithm; the distance-based clustering algorithm can include a k-meams clustering algorithm or a hierarchical clustering algorithm and the like; the density-based clustering algorithm can include a DBSCAN algorithm; a neural network-based clustering algorithm, and common algorithms include SOM algorithm for dispersing an input variable to a target dimension; and a statistics-based clustering algorithm, such as a mode similar to variable iteration, which can generate COBWeb (web spider protocol) in a decision tree form, etc. The k-meams clustering algorithm can perform clustering by taking k points in a space as centers, classify objects closest to the k points, and gradually update the values of the clustering centers through an iteration method until a best clustering result is obtained. The hierarchical clustering algorithm can take each object as a cluster, and then combine the atomic clusters into a cluster which is larger and larger until all the objects are in one cluster, or a certain termination condition is met. The DBSCAN algorithm can define the clusters as a maximum set of points with connected densities, can divide an area with enough high density into clusters, and can discover clusters in any shape in a spatial database of noise. Spectral clustering (SC) is a graph theory-based clustering method for dividing a weighted undirected graph into two or more optimal subgraphs, so that the interiors of the subgraphs are similar as much as possible, and the distance between the subgraphs is as far as possible, thereby achieving the purpose of common clustering.

For example, the Kmeans clustering algorithm, the DBSCAN clustering algorithm and the like are selected, and feature vectors of all parts are clustered to obtain clustering distribution of the feature vectors of all the parts. For example, for the path 1, the path 1 may include 5 road sections, and the 5 road sections are respectively marked as {a, b, c, d, e}. Assuming that the feature vectors of three parts or three different clustering algorithms are obtained in the previous steps, the feature vector types are divided and marked as C1, C2 and C3, the clustering algorithm types are divided and marked as M1, M2 and M3, and different types of clustering are distinguished by different ids. The feature vector types are divided according to different dimensions such as the corresponding people flow density of each road section and surrounding traffic facilities; for example, assuming that the road section a includes 24 traffic flow feature component vectors: I0, I1, I2 . . . I23, each traffic flow feature component vector corresponds to one time interval; and assuming that C1 can represent the people flow density, C2 can represent the traffic facilities and C3 can be a scenic spot, the feature vector types corresponding to the 24 traffic flow feature component vectors included in the road section a can be counted. Assuming that the target value of a put-in area is subjected to binary classification (if only congestion or non-congestion is distinguished), the clustering type can be marked as 1 and 2.

Then, 5 road sections are clustered according to different feature vectors/clustering models, and the obtained clustering result of each feature vector is shown in Table 18 below.

TABLE 18

Clustering result of five road sections

|  | a | b | c | d | e |
|---|---|---|---|---|---|
| C1 feature vector/M1 clustering model | 1 | 1 | 2 | 2 | 2 |
| C2 feature vector/M2 clustering model | 2 | 2 | 1 | 1 | 1 |
| C3 feature vector/M3 clustering model | 1 | 3 | 2 | 2 | 2 |

As shown in Table 18, there are three clustering types because clustering has abnormal points or some clustering algorithms do not specify the number of types. The clustering results of the C1 feature vector (or the M1 clustering model) and the C2 feature vector (or the M2 clustering model) are consistent, and both of which divide the 5 paths into 2 clusters: {{a, b}, {c, d, e}}; and the clustering result of the C3 feature vector (or the M3 clustering model) divides the 5 road sections into 3 clusters: {{a}, {b}, {c, d, e}}.

S730: Call a consistency function to perform integrated clustering on the plurality of clustering results to classify the M road sections in the target path into a plurality of clusters.

In this application, a voting method is used as the consistency function to integrate the clustering results to illustrate the operation steps of the method in this application, and it is also suitable for other consistency functions to perform integrated clustering. The basic idea of the voting method is to share classification information of clustering members on data objects as much as possible, voting is performed according to division of the clustering members on the data objects, and the voting proportion of the data objects divided into each cluster is computed. The data objects with votes exceeding a certain threshold (generally greater than or equal to 0.5) are divided into this cluster.

For example, for the clusters generated according to clustering results of different feature vectors in the previous steps, the cluster generating results of 5 objects (a, b, c, d, e) in C1/M1 and C2/M2 are consistent, namely, the results of classifying each object to the same class in the two clustering results are the same; in three feature vector/clustering model integrated clustering results ({{a, b}, {c, d, e}} and {{a}, {b}, {c, d, e}}), {{a, b}, {c, d, e}} exceeds 0.5, and therefore, the final clustering result is {{a, b}, {c, d, e}}, that is, the 5 objects are divided into two types, the object a and the object b are of the same type, and the object c, the object d and the object e are of the same type.

S740: Determine a target cluster from the plurality of clusters according to the traffic flow information, the road sections in the target cluster being road sections with traffic congestion.

In a possible implementation, firstly, the road sections with traffic congestion in the M road sections are determined according to the traffic flow information, and congestion labels are added to all the determined road sections; then, a proportion of the number of the road sections with the congestion labels in each cluster is counted; and finally, the cluster with the proportion greater than a threshold is determined as the target cluster, and therefore it indicates that the road section in the target cluster are the road section with traffic congestion.

For example, the traffic flow information may include historical congested road sections, the historical congested road sections carry road section labels of all the road sections, and the road section labels may include congestion labels and non-congestion labels. The congestion labels and the non-congestion labels can be determined according to different dimensions such as the scene data of each road section. Assuming that two clusters are obtained by integrated clustering, namely, a cluster 1 and a cluster 2; the cluster 1 includes 13 road sections, and 8 congestion labels are included in the cluster 1, and thus the road sections with the congestion labels account for 8/13 in the cluster 1; the cluster 2 includes 15 road sections, and 4 congestion labels are included in the cluster 2, and thus the road sections with the congestion labels account for 4/15 in the cluster 2. Assuming that the threshold is 50%, the cluster 1 meets the threshold condition, so that the cluster 1 is the target cluster.

S750: Determine road sections in other clusters other than the target cluster as non-congested road sections, and add the non-congested road sections into the road section prediction information.

For example, according to the above-mentioned method, the cluster 1 is the target cluster, 13 road sections included in the cluster 1 are all taken as congested road sections, and new labels such as congestion labels are marked on the 13 road sections, or the cluster 1 is added with a label (congestion labels), and each road section in the cluster with the cluster label being the congestion label is the congested road section. In addition, 15 road sections included in the cluster 2 are all taken as non-congested road sections, and new labels such as non-congestion labels are marked on the 15 road sections, or the cluster 2 is added with a label (non-congestion label), and each road section in the cluster with the cluster label being the non-congestion label is the non-congested road section. Finally, each road section and the corresponding road section label (congestion label/non-congestion label), or each cluster and the corresponding cluster label (congestion label/non-congestion label) can be added and stored in the road section prediction information.

In this application, the traffic flow feature vector of each road section in the time period is constructed through the traffic flow information, then integrated clustering processing is performed based on the constructed traffic flow feature vectors, each road section is classified into the corresponding cluster, and finally the congested road section and the non-congested road section are determined. The traffic flow feature vectors constructed by deeply mining the traffic flow information are relatively accurate, so that the determined road section prediction information is relatively accurate. Further, clustering processing is performed by integrated clustering; and compared with single clustering, the integrated clustering improves the quality of the clustering result and the robustness of clustering, and can detect and process isolated points and noise simultaneously, in addition, the integrated clustering can process data sets in parallel, thereby effectively improving the efficiency.

Figure 8:
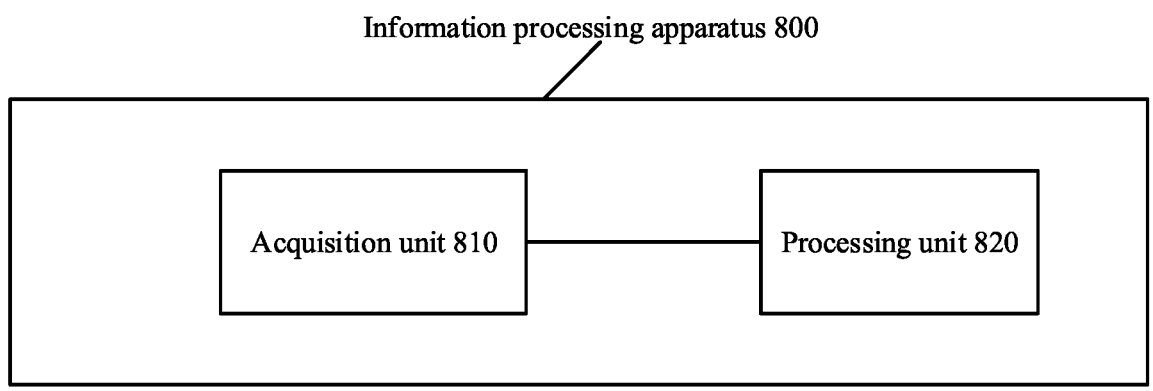
FIG. 8 is a schematic structure diagram of an information processing apparatus according to an embodiment of this application.

Referring to FIG. 8, FIG. 8 is a schematic structure diagram of an information processing apparatus according to an embodiment of this application. An information processing apparatus 800 can be applied to the computer device in the method embodiments corresponding to FIG. 3 to FIG. 7. The apparatus can be configured to execute the corresponding steps in the method provided in this embodiment of this application. The information processing apparatus 800 can include:

an acquisition unit 810, configured to acquire traffic flow information of a target path in a time period T1, the target path including M road sections, the time period T1 being divided into K unit times; the traffic flow information including traffic flow data of each road section in each unit time; M and K both being positive integers;

a processing unit 820, configured to construct traffic flow feature vectors of the M road sections in the time period T1 according to the traffic flow information, and cluster the traffic flow feature vectors to obtain road section prediction information, the road section prediction information including at least one of a congested road section or a non-congested road section, and the processing unit 820 being further configured to perform traffic planning according to the road section prediction information.

In a possible implementation, a time difference between any two adjacent unit times in the K unit times is called a time interval, and the K unit times correspond to K time intervals; and any one of the K unit times is represented as an $i^{th}$ unit time, the time difference between an $(i+1)^{th}$ unit time and the $i^{th}$ unit time represents an $i^{th}$ time interval in the K time intervals, i is a positive integer and i≤K.

In a possible implementation, a free parking space change trend of the N stop areas in the time period T1 is represented by K free parking space change sequences; one free parking space change sequence corresponds to one time interval; the free parking space change sequence corresponding to the $i^{th}$ time interval is represented as $C_i$; and the processing unit 820 is configured to:

construct a free parking space sequence $S_i$ corresponding to the $i^{th}$ unit time according to free parking space data of each stop area at the $i^{th}$ unit time; construct a free parking space sequence $S_{i+1}$ corresponding to the $(i+1)^{th}$ unit time according to the free parking space data of each stop area at the $(i+1)^{th}$ unit time; acquire a free parking space change value between the free parking space sequence $S_i$ and the free parking space sequence $S_{i+1}$; and construct a free parking space change sequence $C_i$ corresponding to the $i^{th}$ time interval according to the free parking space change value.

In a possible implementation, the processing unit 820 is configured to:

acquire a free parking space change trend of the N stop areas in the target path in a time period T2, the time period T2 including a $j^{th}$ time interval, and j being a positive integer; the $j^{th}$ time interval and the $i^{th}$ time interval in the time period T1 respectively indicate the same time interval in different time periods; the free parking space change trend of the N stop areas in the time period T2 being represented by K free parking space change sequences, and the free parking space change sequence corresponding to the $j^{th}$ time interval being represented as $C'_j$; perform sequence mode-based mining on the free parking space change sequence $C_i$ and the free parking space change sequence $C'_j$ by adopting a mining algorithm based on the sequence mode to obtain a free parking space change frequent sequence of the target path at the $i^{th}$ time interval; and add the free parking space change frequent sequence at the $i^{th}$ time interval into parking space prediction information; the parking space prediction information including the free parking space change frequent sequences respectively corresponding to each time interval in the K time intervals.

In a possible implementation, the acquisition unit 810 is further configured to acquire traffic flow information of the target path in the time period T1, the target path including M road sections, the traffic flow information including traffic flow data of each road section at each unit time; M being a positive integer; and the processing unit 820 is further configured to construct traffic flow feature vectors of the M road sections in the time period T1 according to the traffic flow information, and cluster the traffic flow feature vectors to obtain road section prediction information, the road section prediction information including at least one of a congested road section or a non-congested road section, and perform traffic planning for a vehicle along the target path according to the parking space prediction information and the road section prediction information.

In a possible implementation, any one of the K unit times is represented as the $i^{th}$ unit time, i is a positive integer and i≤K; the traffic flow feature vector includes traffic flow feature component vectors at each unit time in the K unit times; and the processing unit 820 is configured to: acquire a traffic flow change value between traffic flow data of each road section at the $i^{th}$ unit time and traffic flow data of each road section at an $(i-1)^{th}$ unit time; and construct the traffic flow feature component vector at the $i^{th}$ unit time according to the traffic flow data and the traffic flow change value of each road section at the $i^{th}$ unit time.

In a possible implementation, any one of the K unit times is represented as the $i^{th}$ unit time, i is a positive integer and i≤K; the traffic flow feature vector includes traffic flow feature component vectors at each unit time in the K unit times; the traffic flow information further includes scene data of the target path in the time period T1, and the scene data includes scene data of the target path at the $i^{th}$ unit time; and the processing unit 820 is configured to: acquire a traffic flow change value between traffic flow data of each road section at the $i^{th}$ unit time and traffic flow data of each road section at the $(i-1)^{th}$ unit time; and standardize the scene data at the $i^{th}$ unit time to obtain scene features at the $i^{th}$ unit time; and construct traffic flow feature component vectors at the $i^{th}$ unit time according to the traffic flow data and the traffic flow change value of each road section at the $i^{th}$ unit time, and the scene features at the $i^{th}$ unit time.

In a possible implementation, the processing unit 820 is configured to: cluster K traffic flow feature component vectors included in the traffic flow feature vectors through at least one clustering algorithm to obtain a plurality of clustering results; call a consistency function to perform integrated clustering on the plurality of clustering results to classify the M road sections in the target path into a plurality of clusters; determine a target cluster from the plurality of clusters according to the traffic flow information, the road sections in the target cluster being road sections with traffic congestion; and determine road sections in other clusters other than the target cluster as non-congested road sections, and add the non-congested road sections into the road section prediction information.

In a possible implementation, the processing unit 820 is configured to: determine the road sections with traffic congestion in the M road sections according to the traffic flow information, and add congestion labels to the determined road sections; count a proportion of the number of the road sections including the congestion labels in each cluster; and determine the clusters with the proportion greater than a threshold as the target cluster.

In a possible implementation, the processing unit 820 is configured to: perform parking planning according to the parking space prediction information; or perform path planning according to the road section prediction information; or perform traffic travel planning according to the parking space prediction information and the road section prediction information.

In a possible implementation, the parking space prediction information includes free parking space change frequent sequences corresponding to a plurality of time intervals respectively; and the processing unit 820 is configured to: determine a stop area to be recommended from the free parking space change frequent sequence in the parking space prediction information according to travel time and a navigation path; and recommend the stop area.

In a possible implementation, the road section prediction information includes at least one non-congested road section; and the processing unit 820 is configured to: select one or more non-congested road sections from the road section prediction information to combine into a navigation path according to a navigation starting point and a navigation end point; and recommend the combined navigation path.

In a possible implementation, the parking space prediction information includes free parking space change frequent sequences corresponding to a plurality of time intervals respectively; the road section prediction information includes at least one non-congested road section; and the processing unit 820 is configured to: select one or more non-congested road sections from the road section prediction information to combine into the navigation path according to the travel time, the navigation starting point and the navigation end point; determine a stop area to be recommended from the free parking space change frequent sequence in the parking space prediction information according to the travel time and the combined navigation path; and recommend the combined navigation path and the stop area to be recommended.

In this embodiment of this application, the free parking space information objectively reflects the real condition of a traffic scene, and the parking space prediction information is obtained by deeply mining the free parking space information, so that the parking space prediction information is obtained after fully mining the real condition of the traffic scene, as a result, the accuracy of the parking space prediction information is improved, and the traffic planning performed based on the parking space prediction information can well adapt to the requirements of the traffic scene, and the traffic planning made in this way is more accurate and more instructive.

Figure 9:
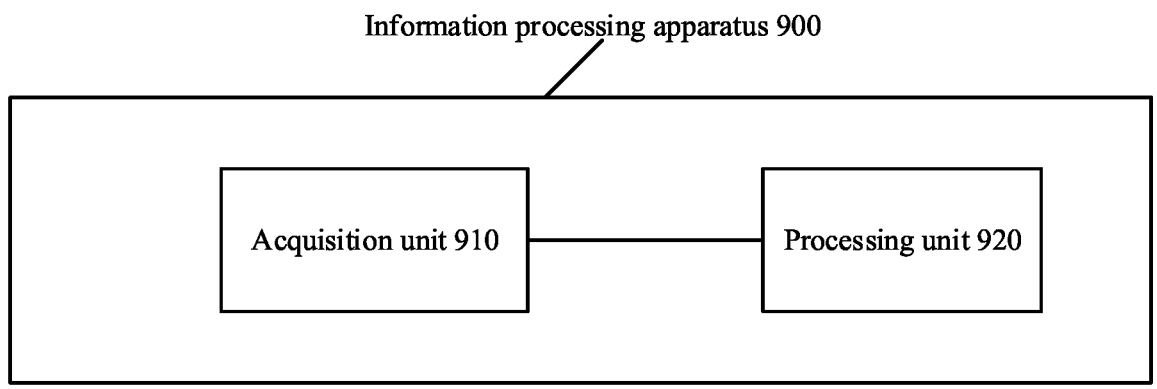
FIG. 9 is a schematic structure diagram of another information processing apparatus according to an embodiment of this application.

Referring to FIG. 9, FIG. 9 is a schematic structure diagram of an information processing apparatus according to an embodiment of this application. An information processing apparatus 900 can be applied to the computer device in the method embodiments corresponding to FIG. 3 to FIG. 7. The apparatus can be configured to execute the corresponding steps in the method provided in this embodiment of this application. The information processing apparatus 900 can include:

an acquisition unit 910, configured to acquire traffic flow information of a target path in a time period T1, the target path including M road sections, the time period T1 being divided into K unit times; the traffic flow information including traffic flow data of each road section in each unit time; M and K both being positive integers;

a processing unit 920, configured to construct traffic flow feature vectors of the M road sections in the time period T1 according to the traffic flow information, and cluster the traffic flow feature vectors to obtain road section prediction information, the road section prediction information including at least one of a congested road section or a non-congested road section, and the processing unit 920 being further configured to perform traffic planning according to the road section prediction information.

In this embodiment of this application, the traffic flow information objectively reflects the real condition of the traffic scene, and the road section prediction information is obtained by analyzing and clustering the traffic flow information, so that the road section prediction information is obtained after fully mining the real condition of the traffic scene, as a result, the accuracy of the road section prediction information is improved, and the traffic planning performed based on the road section prediction information can well adapt to the requirements of the traffic scene, and the traffic planning made in this way is more accurate and more instructive.

Figure 10:
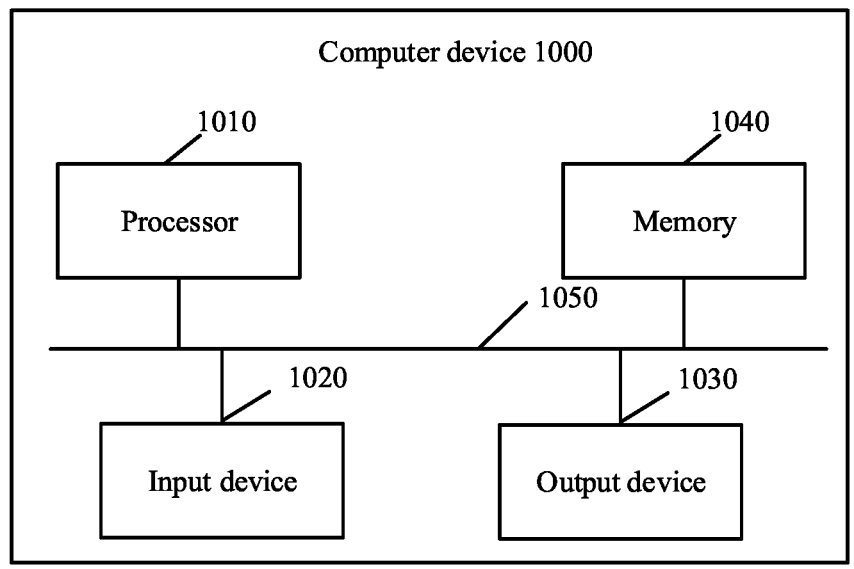
FIG. 10 is a schematic structure diagram of a computer device according to an embodiment of this application.

Referring to FIG. 10, FIG. 10 is a schematic structure diagram of a computer device according to an embodiment of this application. The computer device 1000 is configured to execute the steps executed by the computer device in the method embodiments corresponding to FIG. 3 to FIG. 7. The computer device 1000 includes: one or more processors 1010, one or more input devices 1020, one or more output devices 1030 and a memory 1040. The processors 1010, the input devices 1020, the output devices 1030 and the memory 1040 are connected through buses 1050. The memory 1040 is configured to store a computer program, the computer program includes a program instruction; the processors 1010 are configured to execute the program instruction stored in the memory 1040 and execute the following operations:

acquire free parking space information of a target path in a time period T1, the target path including N stop areas, the time period T1 being divided into K unit times; the free parking space information including free parking space data of each stop area in each unit time; and N and K both being positive integers; determine a free parking space change trend of the N stop areas in the time period T1 according to the free parking space information, and mine the free parking space change trend of the N stop areas in the time period T1 to obtain parking space prediction information; and perform traffic planning for a vehicle along the target path according to the parking space prediction information.

In a possible implementation, a time difference between any two adjacent unit times in the K unit times is called a time interval, and the K unit times correspond to K time intervals; and any one of the K unit times is represented as an $i^{th}$ unit time, the time difference between an $(i+1)^{th}$ unit time and the $i^{th}$ unit time represents an $i^{th}$ time interval in the K time intervals, i is a positive integer and i≤K.

In a possible implementation, a free parking space change trend of the N stop areas in the time period T1 is represented by K free parking space change sequences; one free parking space change sequence corresponds to one time interval; the free parking space change sequence corresponding to the $i^{th}$ time interval is represented as $C_i$; and the processor 1010 is further configured to execute the program instruction stored in the memory 1040 and execute the following operations: construct a free parking space sequence $S_i$ corresponding to the $i^{th}$ unit time according to free parking space data of each stop area at the $i^{th}$ unit time; construct a free parking space sequence $S_{i+1}$ corresponding to the $(i+1)^{th}$ unit time according to the free parking space data of each stop area at the $(i+1)^{th}$ unit time; acquire a free parking space change value between the free parking space sequence $S_i$ and the free parking space sequence $S_{i+1}$; and construct a free parking space change sequence $C_i$ corresponding to the $i^{th}$ time interval according to the free parking space change value.

In a possible implementation, the processor 1010 is further configured to execute the program instruction stored in the memory 1040 and execute the following operations: acquire a free parking space change trend of the N stop areas in the target path in a time period T2, the time period T2 including a $j^{th}$ time interval, and j being a positive integer; the $j^{th}$ time interval and the $i^{th}$ time interval in the time period T1 respectively indicate the same time interval in different time periods; the free parking space change trend of the N stop areas in the time period T2 being represented by K free parking space change sequences, and the free parking space change sequence corresponding to the $j^{th}$ time interval being represented as $C'_j$; perform sequence mode-based mining on the free parking space change sequence $C_i$ and the free parking space change sequence $C'_j$ by adopting a mining algorithm based on the sequence mode to obtain a free parking space change frequent sequence of the target path at the $i^{th}$ time interval; and add the free parking space change frequent sequence at the $i^{th}$ time interval into parking space prediction information; the parking space prediction information including the free parking space change frequent sequences respectively corresponding to each time interval in the K time intervals.

In a possible implementation, the processor 1010 is further configured to execute the program instruction stored in the memory 1040 and execute the following operations: acquire traffic flow information of the target path in the time period T1, the target path including M road sections, the traffic flow information including traffic flow data of each road section at each unit time, and M being a positive integer; and construct traffic flow feature vectors of the M road sections in the time period T1 according to the traffic flow information, and cluster the traffic flow feature vectors to obtain road section prediction information, the road section prediction information including at least one of a congested road section or a non-congested road section; and
the processor 1010 is further configured to execute the program instruction stored in the memory 1040 and execute the following operations: perform traffic planning for a vehicle along the target path according to the parking space prediction information and the road section prediction information.

In a possible implementation, any one of the K unit times is represented as the $i^{th}$ unit time, i is a positive integer and i≤K; the traffic flow feature vector includes traffic flow feature component vectors at each unit time in the K unit times; and
the processor 1010 is further configured to execute the program instruction stored in the memory 1040 and execute the following operations: acquire a traffic flow change value between traffic flow data of each road section at the $i^{th}$ unit time and traffic flow data of each road section at an $(i-1)^{th}$ unit time; and construct the traffic flow feature component vector at the $i^{th}$ unit time according to the traffic flow data and the traffic flow change value of each road section at the $i^{th}$ unit time.

In a possible implementation, any one of the K unit times is represented as the $i^{th}$ unit time, i is a positive integer and i≤K; the traffic flow feature vector includes traffic flow feature component vectors at each unit time in the K unit times; the traffic flow information further includes scene data of the target path in the time period T1, and the scene data includes scene data of the target path at the $i^{th}$ unit time; and the processor 1010 is further configured to execute the program instruction stored in the memory 1040 and execute the following operations: acquire a traffic flow change value between traffic flow data of each road section at the $i^{th}$ unit time and traffic flow data of each road section at the $(i-1)^{th}$ unit time; standardize the scene data at the $i^{th}$ unit time to obtain scene features at the $i^{th}$ unit time; and construct traffic flow feature component vectors at the $i^{th}$ unit time according to the traffic flow data and the traffic flow change value of each road section at the $i^{th}$ unit time, and the scene features at the $i^{th}$ unit time.

In a possible implementation, the processor 1010 is further configured to execute the program instruction stored in the memory 1040 and execute the following operations: cluster K traffic flow feature component vectors included in the traffic flow feature vectors through at least one clustering algorithm to obtain a plurality of clustering results; call a consistency function to perform integrated clustering on the plurality of clustering results to classify the M road sections in the target path into a plurality of clusters; determine a target cluster from the plurality of clusters according to the traffic flow information, the road sections in the target cluster being road sections with traffic congestion; and determine road sections in other clusters other than the target cluster as non-congested road sections, and add the non-congested road sections into the road section prediction information.

In a possible implementation, the processor 1010 is further configured to execute the program instruction stored in the memory 1040 and execute the following operations: determine the road sections with traffic congestion in the M road sections according to the traffic flow information, and add congestion labels to the determined road sections; count a proportion of the number of the road sections including the congestion labels in each cluster; and determine the clusters with the proportion greater than a threshold as the target cluster.

In a possible implementation, the processor 1010 is further configured to execute the program instruction stored in the memory 1040 and execute the following operations: perform parking planning according to the parking space prediction information; or perform path planning according to the road section prediction information; or perform traffic travel planning according to the parking space prediction information and the road section prediction information.

In a possible implementation, the parking space prediction information includes free parking space change frequent sequences corresponding to a plurality of time intervals respectively; the processor 1010 is further configured to execute the program instruction stored in the memory 1040 and execute the following operations: determine a stop area to be recommended from the free parking space change frequent sequence in the parking space prediction information according to travel time and a navigation path; and recommend the stop area.

In a possible implementation, the road section prediction information includes at least one non-congested road section; and the processor 1010 is further configured to execute the program instruction stored in the memory 1040 and execute the following operations: select one or more non-congested road sections from the road section prediction information to combine into a navigation path according to a navigation starting point and a navigation end point; and recommend the combined navigation path.

In a possible implementation, the parking space prediction information includes free parking space change frequent sequences corresponding to a plurality of time intervals respectively; the road section prediction information includes at least one non-congested road section; and the processor 1010 is further configured to execute the program instruction stored in the memory 1040 and execute the following operations: select one or more non-congested road sections from the road section prediction information to combine into the navigation path according to the travel time, the navigation starting point and the navigation end point; determine a stop area to be recommended from the free parking space change frequent sequence in the parking space prediction information according to travel time and a navigation path; and recommending the navigation path and the stop area to be recommended.

Figure 11:
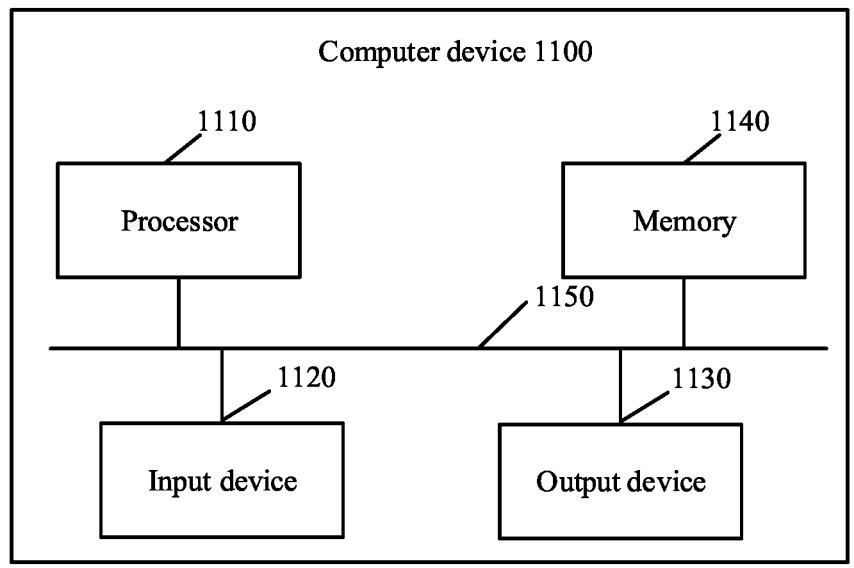
FIG. 11 is a schematic structure diagram of a computer device according to an embodiment of this application.

Referring to FIG. 11, FIG. 11 is a schematic structure diagram of a computer device according to an embodiment of this application. The computer device 1100 is configured to execute the steps executed by the computer device in the method embodiments corresponding to FIG. 3 to FIG. 7. The computer device 1100 includes: one or more processors 1111, one or more input devices 1120, one or more output devices 1130 and a memory 1140. The processors 1111, the input devices 1120, the output devices 1130 and the memory 1140 are connected through buses 1150. The memory 1140 is configured to store a computer program, the computer program includes a program instruction; the processors 1111 are configured to execute the program instruction stored in the memory 1140 and execute the following operations:

acquire traffic flow information of a target path in a time period T1, the target path including M road sections, the time period T1 being divided into K unit times; the traffic flow information including traffic flow data of each road section in each unit time; and M and K both being positive integers; construct traffic flow feature vectors of the M road sections in the time period T1 according to the traffic flow information, and cluster the traffic flow feature vectors to obtain road section prediction information, the road section prediction information including at least one of a congested road section or a non-congested road section; and perform traffic planning according to the road section prediction information.

It is to be understood that the computer device described in this embodiment of this application can execute description of the information processing method in the embodiments corresponding to FIG. 3 to FIG. 7, and can also execute description of the information processing apparatus 800 and the information processing apparatus 900 in the embodiments corresponding to FIG. 8 and FIG. 9, and no more description is made herein. In addition, the description of beneficial effects of adopting the same method is not described herein again.

In addition, this embodiment of this application further provides a computer storage medium; the computer program executed by the above-mentioned information processing apparatus 800 or the information processing apparatus 900 is stored in the computer storage medium, and the computer program includes the program instruction; when the processor executes the program instruction, the methods in the embodiments corresponding to FIG. 3 to FIG. 7 can be executed, and no more description is made herein. For technical details that are not disclosed in the computer storage medium embodiments of this application, refer to the descriptions of the method embodiments of this application. As an example, the program instruction can be deployed on one computer device or executed on a plurality of computer devices located at one place, or executed on a plurality of computer devices which are distributed at a plurality of places and connected with one another through a communication network, and the plurality of computer devices which are distributed at the plurality of places and connected with one another through the communication network can form a blockchain system.

According to one aspect of this application, a computer program product or computer program is provided. The computer program product or the computer program includes the computer instruction, and the computer instruction is stored in a computer-readable storage medium. The processor of the computer device reads the computer instruction from the computer-readable storage medium, and the processor executes the computer instruction, so that the computer device can execute the methods in the embodiments corresponding to FIG. 3 to FIG. 7, and no more description is made herein.

A person of ordinary skill in the art may understand that all or some of the processes of the methods in the embodiments may be implemented by a computer program instructing relevant hardware. The program may be stored in a computer-readable storage medium. When the program is executed, the procedures of the above-mentioned method embodiments are performed. The above-mentioned storage medium may be a magnetic disc, an optical disc, a read-only memory (ROM), a random access memory (RAM), or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. What is disclosed above is merely exemplary embodiments of this application, and certainly is not intended to limit the scope of the claims of this application. Therefore, equivalent variations made in accordance with the claims of this application shall fall within the scope of this application.

What is claimed is:

1. An information processing method performed by a computer device, the method comprising:
   acquiring free parking space information of a target path in a time period T1, the target path comprising N stop areas, the time period T1 being divided into K unit times; the free parking space information comprising free parking space data of each stop area in each unit time; and N and K both being positive integers, wherein each one of the K unit times is represented as an $i^{th}$ unit time, i being a positive integer and i≤K;
   determining a free parking space change trend of the N stop areas in the time period T1 according to the free parking space information;
   mining the free parking space change trend of the N stop areas in the time period T1 to obtain parking space prediction information;
   acquiring traffic flow information of the target path in the time period T1, the target path comprising M road sections, the traffic flow information comprising traffic flow data of each road section at each unit time, M being a positive integer;
   constructing traffic flow feature vectors of the M road sections in the time period T1 according to the traffic flow information;
   clustering the traffic flow feature vectors to obtain road section prediction information, the road section prediction information comprising at least one of a congested road section or a non-congested road section; and
   performing traffic planning for a vehicle along the target path according to the parking space prediction information and the road section prediction information.

2. The method according to claim 1, wherein the free parking space change trend of the N stop areas in the time period T1 is represented by K free parking space change sequences, one free parking space change sequence corresponding to one time interval; the free parking space change sequence corresponding to the $i^{th}$ time interval is represented as $C_i$;
   the determining a free parking space change trend of the N stop areas in the time period T1 according to the free parking space information comprises:
   constructing a free parking space sequence $S_i$ corresponding to the $i^{th}$ unit time according to free parking space data of each stop area at the $i^{th}$ unit time;
   constructing a free parking space sequence $S_{i+1}$ corresponding to the $(i+1)^{th}$ unit time according to the free parking space data of each stop area at the $(i+1)^{th}$ unit time;
   acquiring a free parking space change value between the free parking space sequence $S_i$ and the free parking space sequence $S_{i+1}$; and
   constructing the free parking space change sequence $C_i$ corresponding to the $i^{th}$ time interval according to the free parking space change value.

3. The method according to claim 2, wherein the mining the free parking space change trend of the N stop areas in the time period T1 to obtain parking space prediction information comprises:
   acquiring a free parking space change trend of the N stop areas in the target path in a time period T2, the time period T2 comprising a $j^{th}$ time interval, j being a positive integer; the $j^{th}$ time interval and the $i^{th}$ time interval in the time period T1 respectively indicating a same time interval in different time periods; the free parking space change trend of the N stop areas in the time period T2 being represented by K free parking space change sequences, and the free parking space change sequence corresponding to the $j^{th}$ time interval being represented as $C'_j$;
   performing sequence mode-based mining on the free parking space change sequence $C_i$ and the free parking space change sequence $C'_j$ by adopting a mining algorithm based on the sequence mode to obtain a free parking space change frequent sequence of the target path at the $i^{th}$ time interval; and
   adding the free parking space change frequent sequence at the $i^{th}$ time interval into the parking space prediction information; the parking space prediction information comprising the free parking space change frequent sequences respectively corresponding to each time interval in the K time intervals.

4. The method according to claim 1, wherein the traffic flow feature vector comprising traffic flow feature component vectors at each unit time in the K unit times;
   the constructing traffic flow feature vectors of the M road sections in the time period T1 according to the traffic flow information comprises:
   acquiring a traffic flow change value between traffic flow data of each road section at the $i^{th}$ unit time and traffic flow data of each road section at an $(i-1)^{th}$ unit time; and
   constructing the traffic flow feature component vector at the $i^{th}$ unit time according to the traffic flow data of each road section at the $i^{th}$ unit time and the traffic flow change value.

5. The method according to claim 1, wherein the traffic flow feature vector comprising traffic flow feature component vectors at each unit time in the K unit times; the traffic flow information further comprising scene data of the target path in the time period T1, and the scene data comprising scene data of the target path at the $i^{th}$ unit time;
   the constructing traffic flow feature vectors of the M road sections in the time period T1 according to the traffic flow information comprises:
   acquiring a traffic flow change value between traffic flow data of each road section at the $i^{th}$ unit time and traffic flow data of each road section at an $(i-1)^{th}$ unit time;
   standardizing the scene data at the $i^{th}$ unit time to obtain scene features at the $i^{th}$ unit time; and
   constructing the traffic flow feature component vectors at the $i^{th}$ unit time according to the traffic flow data of each road section at the $i^{th}$ unit time, the traffic flow change value and the scene features at the $i^{th}$ unit time.

6. The method according to claim 4, wherein the clustering the traffic flow feature vectors to obtain road section prediction information comprises:
   clustering K traffic flow feature component vectors comprised in the traffic flow feature vector through at least one clustering algorithm to obtain a plurality of clustering results;
   calling a consistency function to perform integrated clustering on the plurality of clustering results to classify the M road sections in the target path into a plurality of clusters;
   determining a target cluster from the plurality of clusters according to the traffic flow information, the road sections in the target cluster being road sections with traffic congestion; and
   determining road sections in other clusters other than the target cluster as non-congested road sections, and adding the non-congested road sections into the road section prediction information.

7. The method according to claim 6, wherein the determining a target cluster from the plurality of clusters according to the traffic flow information comprises:
determining the road sections with traffic congestion in the M road sections according to the traffic flow information, and adding congestion labels to the determined road sections;
counting a proportion of the number of the road sections comprising the congestion labels in each cluster; and
determining the cluster with the proportion greater than a threshold as the target cluster.

8. The method according to claim 1, wherein the parking space prediction information comprises free parking space change frequent sequences corresponding to a plurality of time intervals respectively; the road section prediction information comprises at least one non-congested road section;
the performing traffic planning for a vehicle along the target path according to the parking space prediction information and the road section prediction information comprises:
selecting one or more non-congested road sections from the road section prediction information to combine to form a navigation path according to a travel time, a navigation starting point and a navigation end point;
determining a stop area to be recommended from the free parking space change frequent sequences in the parking space prediction information according to the travel time and the navigation path; and
recommending the navigation path and the stop area to be recommended.

9. A computer device, comprising a memory and a processor, the memory storing one or more program instructions that, when executed by the processor, cause the computer device to perform an information processing method including:
acquiring free parking space information of a target path in a time period T1, the target path comprising N stop areas, the time period T1 being divided into K unit times; the free parking space information comprising free parking space data of each stop area in each unit time; and N and K both being positive integers, wherein each one of the K unit times is represented as an $i^{th}$ unit time, i being a positive integer and i≤K;
determining a free parking space change trend of the N stop areas in the time period T1 according to the free parking space information;
mining the free parking space change trend of the N stop areas in the time period T1 to obtain parking space prediction information;
acquiring traffic flow information of the target path in the time period T1, the target path comprising M road sections, the traffic flow information comprising traffic flow data of each road section at each unit time, M being a positive integer;
constructing traffic flow feature vectors of the M road sections in the time period T1 according to the traffic flow information;
clustering the traffic flow feature vectors to obtain road section prediction information, the road section prediction information comprising at least one of a congested road section or a non-congested road section; and
performing traffic planning for a vehicle along the target path according to the parking space prediction information and the road section prediction information.

10. The computer device according to claim 9, wherein the free parking space change trend of the N stop areas in the time period T1 is represented by K free parking space change sequences, one free parking space change sequence corresponding to one time interval; the free parking space change sequence corresponding to the $i^{th}$ time interval is represented as $C_i$;
the determining a free parking space change trend of the N stop areas in the time period T1 according to the free parking space information comprises:
constructing a free parking space sequence $S_i$ corresponding to the $i^{th}$ unit time according to free parking space data of each stop area at the $i^{th}$ unit time;
constructing a free parking space sequence $S_{i+1}$ corresponding to the $(i+1)^{th}$ unit time according to the free parking space data of each stop area at the $(i+1)^{th}$ unit time;
acquiring a free parking space change value between the free parking space sequence $S_i$ and the free parking space sequence $S_{i+1}$; and
constructing the free parking space change sequence $C_i$ corresponding to the $i^{th}$ time interval according to the free parking space change value.

11. The computer device according to claim 10, wherein the mining the free parking space change trend of the N stop areas in the time period T1 to obtain parking space prediction information comprises:
acquiring a free parking space change trend of the N stop areas in the target path in a time period T2, the time period T2 comprising a $j^{th}$ time interval, j being a positive integer; the $j^{th}$ time interval and the $i^{th}$ time interval in the time period T1 respectively indicating a same time interval in different time periods; the free parking space change trend of the N stop areas in the time period T2 being represented by K free parking space change sequences, and the free parking space change sequence corresponding to the $j^{th}$ time interval being represented as $C'_j$;
performing sequence mode-based mining on the free parking space change sequence $C_i$ and the free parking space change sequence $C'_j$ by adopting a mining algorithm based on the sequence mode to obtain a free parking space change frequent sequence of the target path at the $i^{th}$ time interval; and
adding the free parking space change frequent sequence at the $i^{th}$ time interval into the parking space prediction information; the parking space prediction information comprising the free parking space change frequent sequences respectively corresponding to each time interval in the K time intervals.

12. The computer device according to claim 9, wherein the traffic flow feature vector comprising traffic flow feature component vectors at each unit time in the K unit times;
the constructing traffic flow feature vectors of the M road sections in the time period T1 according to the traffic flow information comprises:
acquiring a traffic flow change value between traffic flow data of each road section at the $i^{th}$ unit time and traffic flow data of each road section at an $(i-1)^{th}$ unit time; and
constructing the traffic flow feature component vector at the $i^{th}$ unit time according to the traffic flow data of each road section at the $i^{th}$ unit time and the traffic flow change value.

13. The computer device according to claim 9, wherein the traffic flow feature vector comprising traffic flow feature component vectors at each unit time in the K unit times; the traffic flow information further comprising scene data of the target path in the time period T1, and the scene data comprising scene data of the target path at the $i^{th}$ unit time;
  the constructing traffic flow feature vectors of the M road sections in the time period T1 according to the traffic flow information comprises:
    acquiring a traffic flow change value between traffic flow data of each road section at the $i^{th}$ unit time and traffic flow data of each road section at an $(i-1)^{th}$ unit time;
    standardizing the scene data at the $i^{th}$ unit time to obtain scene features at the $i^{th}$ unit time; and
    constructing the traffic flow feature component vectors at the $i^{th}$ unit time according to the traffic flow data of each road section at the $i^{th}$ unit time, the traffic flow change value and the scene features at the $i^{th}$ unit time.

14. The computer device according to claim 9, wherein the parking space prediction information comprises free parking space change frequent sequences corresponding to a plurality of time intervals respectively; the road section prediction information comprises at least one non-congested road section;
  the performing traffic planning for a vehicle along the target path according to the parking space prediction information and the road section prediction information comprises:
    selecting one or more non-congested road sections from the road section prediction information to combine to form a navigation path according to a travel time, a navigation starting point and a navigation end point;
    determining a stop area to be recommended from the free parking space change frequent sequences in the parking space prediction information according to the travel time and the navigation path; and
    recommending the navigation path and the stop area to be recommended.

15. A non-transitory computer-readable storage medium, storing one or more program instructions that, when executed by a processor of a computer device, cause the computer device to perform an information processing method including:
  acquiring free parking space information of a target path in a time period T1, the target path comprising N stop areas, the time period T1 being divided into K unit times; the free parking space information comprising free parking space data of each stop area in each unit time; and N and K both being positive integers, wherein each one of the K unit times is represented as an $i^{th}$ unit time, i being a positive integer and i≤K;
  determining a free parking space change trend of the N stop areas in the time period T1 according to the free parking space information;
  mining the free parking space change trend of the N stop areas in the time period T1 to obtain parking space prediction information;
  acquiring traffic flow information of the target path in the time period T1, the target path comprising M road sections, the traffic flow information comprising traffic flow data of each road section at each unit time, M being a positive integer;
  constructing traffic flow feature vectors of the M road sections in the time period T1 according to the traffic flow information;
  clustering the traffic flow feature vectors to obtain road section prediction information, the road section prediction information comprising at least one of a congested road section or a non-congested road section; and
  performing traffic planning for a vehicle along the target path according to the parking space prediction information and the road section prediction information.

16. The non-transitory computer-readable storage medium according to claim 15, wherein the traffic flow feature vector comprising traffic flow feature component vectors at each unit time in the K unit times;
  the constructing traffic flow feature vectors of the M road sections in the time period T1 according to the traffic flow information comprises:
    acquiring a traffic flow change value between traffic flow data of each road section at the $i^{th}$ unit time and traffic flow data of each road section at an $(i-1)^{th}$ unit time; and
    constructing the traffic flow feature component vector at the $i^{th}$ unit time according to the traffic flow data of each road section at the $i^{th}$ unit time and the traffic flow change value.

17. The non-transitory computer-readable storage medium according to claim 15, wherein the traffic flow feature vector comprising traffic flow feature component vectors at each unit time in the K unit times; the traffic flow information further comprising scene data of the target path in the time period T1, and the scene data comprising scene data of the target path at the $i^{th}$ unit time;
  the constructing traffic flow feature vectors of the M road sections in the time period T1 according to the traffic flow information comprises:
    acquiring a traffic flow change value between traffic flow data of each road section at the $i^{th}$ unit time and traffic flow data of each road section at an $(i-1)^{th}$ unit time;
    standardizing the scene data at the $i^{th}$ unit time to obtain scene features at the $i^{th}$ unit time; and
    constructing the traffic flow feature component vectors at the $i^{th}$ unit time according to the traffic flow data of each road section at the $i^{th}$ unit time, the traffic flow change value and the scene features at the $i^{th}$ unit time.

18. The non-transitory computer-readable storage medium according to claim 15, wherein the parking space prediction information comprises free parking space change frequent sequences corresponding to a plurality of time intervals respectively; the road section prediction information comprises at least one non-congested road section;
  the performing traffic planning for a vehicle along the target path according to the parking space prediction information and the road section prediction information comprises:
    selecting one or more non-congested road sections from the road section prediction information to combine to form a navigation path according to a travel time, a navigation starting point and a navigation end point;
    determining a stop area to be recommended from the free parking space change frequent sequences in the parking space prediction information according to the travel time and the navigation path; and
    recommending the navigation path and the stop area to be recommended.

* * * * *